(12) United States Patent
Etacheri et al.

(10) Patent No.: US 8,551,909 B2
(45) Date of Patent: Oct. 8, 2013

(54) VISIBLE LIGHT ACTIVATABLE PHOTOCATALYST

(75) Inventors: Vinodkumar Etacheri, Dublin (IE); Surresh C. Pillai, County Dublin (IE); John Colreavy, County Kildare (IE)

(73) Assignee: Dublin Institute of Technology Intellectual Property Ltd, Dublin (IE)

( * ) Notice: Subject to any disclaimer, the term of this patent is extended or adjusted under 35 U.S.C. 154(b) by 53 days.

(21) Appl. No.: 12/736,118

(22) PCT Filed: Mar. 9, 2009

(86) PCT No.: PCT/IE2009/000008
§ 371 (c)(1),
(2), (4) Date: Oct. 7, 2010

(87) PCT Pub. No.: WO2009/113045
PCT Pub. Date: Sep. 17, 2009

(65) Prior Publication Data
US 2011/0028311 A1 Feb. 3, 2011

(30) Foreign Application Priority Data
Mar. 10, 2008 (GB) .................................. 0804365.5

(51) Int. Cl.
B01J 37/34 (2006.01)
B01J 23/00 (2006.01)
C01G 23/047 (2006.01)

(52) U.S. Cl.
USPC ............... 502/350; 502/5; 423/610; 423/611; 423/612

(58) Field of Classification Search
USPC ................................. 502/5, 350; 423/610–612
See application file for complete search history.

(56) References Cited

U.S. PATENT DOCUMENTS

| | | | | |
|---|---|---|---|---|
| 6,835,688 B2 * | 12/2004 | Morikawa et al. | ............. | 502/200 |
| 7,138,357 B2 * | 11/2006 | Karvinen et al. | ............. | 502/216 |
| 7,169,733 B2 * | 1/2007 | Wang et al. | ................... | 502/300 |
| 7,521,394 B2 * | 4/2009 | Xie et al. | ...................... | 502/350 |
| 7,771,688 B2 * | 8/2010 | Lee et al. | ...................... | 423/386 |
| 7,795,173 B2 * | 9/2010 | Vanderspurt et al. | ......... | 502/350 |
| 2004/0120885 A1 * | 6/2004 | Okusako | ....................... | 423/610 |

FOREIGN PATENT DOCUMENTS

JP          09-262482          * 10/1997

OTHER PUBLICATIONS

"Visible-Light Photocatalysis in Nitrogen-Doped Titanium Oxides," R. Asahi et al. Science, vol. 23 (Jul. 13, 2001), pp. 269-271.*
"Doped-TiO2: A Review," Adriana Zaleska. Recent Patents on Engineering 2008, 2, pp. 157-164.*
J. Zhu et al., "$Fe^{3+}$-TiO2 photocatalysts prepared by combining sol-gel method with hydrothermal treatment and their characterization," Journal of Photochemistry and Photobiology A: Chemistry, May 15, 2006, vol. 180, No. 1-2, pp. 196-204.

(Continued)

*Primary Examiner* — Patricia L Hailey
(74) *Attorney, Agent, or Firm* — Jacobson Holman PLLC

(57) ABSTRACT

A visible light activatable mesoporous titanium dioxide photocatalyst having a surface area of from 100 $m^2$/g to 400 $m^2$/g. The photocatalyst may have a rate of decomposition greater than 0.005 $min^{-1}$. The photocatalyst may have a band gap width less than 2.95 eV. The photocatalyst may comprise undoped titanium dioxide or doped titanium dioxide. A hydrothermal process for synthesising a photocatalyst is also described.

18 Claims, 19 Drawing Sheets

(56) References Cited

OTHER PUBLICATIONS

F. Bosc et al., "Room temperature visible light oxidation of CO by high surface area rutile $TiO_2$—supported metal photocatalyst," Applied Catalysis B: Environmental, Dec. 22, 2006, vol. 69, No. 34, pp. 133-137.

S. Sakthivel et al., "Photocatalytic and Photoelectrochemical Properties of Nitrogen-Doped Titanium Dioxide," Chemphyschem—A European Journal of Chemical Physics and Physicalchemistry, Jan. 1, 2003, vol. 4, No. 5, pp. 487-490.

L. Wu et al., "Characterization and photocatalytic mechanism of nanosized CdS coupled $TiO_2$ nanocrystals under visible light irradiation," Journal of Molecular Catalysis, A: Chemical, Feb. 1, 2006, vol. 244, No. 1-2, pp. 25-32.

S. Yin et al., "Synthesis of visible-light-active nanosize rutile titania photocatalyst by low temperature dissolution-reprecipitation process," Journal of Photochemistry and Photobiology A: Chemistry, 2004, vol. 163, pp. 1-8.

T. Ohno et al., "Photocatalytic Activity of S-doped $TiO_2$ Photocatalyst under Visible Light," Chemistry Letters, Jan. 1, 2003, vol. 32, No. 4, pp. 364-365.

\* cited by examiner

A

B

C

D

VISIBLE LIGHT ACTIVATABLE PHOTOCATALYST

This is a national stage of PCT/IE09/000008 filed Mar. 9, 2009 and published in English, which has a priority of United Kingdom no. 0804365.5 filed Mar. 10, 2008, hereby incorporated by reference.

The invention relates to a photocatalyst. In particular the invention relates to a visible light activatable photocatalyst.

Commercially available titanium dioxide photocatalysts are know such as Degaussa P25 (a titanium dioxide photocatalyst comprising 75% anatase phase titanium dioxide and 25% rutile, phasae titanium dioxide), however these photocatalysts are activated by ultraviolet light (light with a wavelength under 400 nm) irradiation. Such UV activatable photocatalysts are not suitable, for use under ambient (visible) light conditions.

STATEMENTS OF INVENTION

According to the invention there is provided a visible light activatable mesoporous titanium dioxide photocatalyst having a surface area of from 100 $m^2/g$ to 400 $m^2/g$. The photocatalyst may have a surface area of from 150 $m^2/g$ to 350 $m^2/g$ such as from 200 $m^2/g$ to 300 $m^2/g$.

The photocatalyst may have a rate of decomposition greater than 0.005 $min^{-1}$, such as a rate of decomposition greater than 0.006 $min^{-1}$, for example a rate of decomposition greater than 0:007 $min^{-1}$.

The photocatalyst may have a band gap width less than 2.95 eV. The photocatalyst may have a band gap width of 2.9 eV or less. The photocatalyst may have a band gap width of 2.82 eV less.

The photocatalyst may comprise undoped titanium dioxide:

The photocatalyst may comprise doped titanium dioxide. The dopant may be selected from any one or more of the group comprising: fluorine, iron, nitrogen, phosphor, and sulphur. The dopant may comprise between about 1:0.0001 and about 1:0.5 molar ratio titanium dioxide:dopant. The dopant may comprise between about 1:0.05 to about 1:0.25 molar ratio titanium dioxide:dopant. The dopant may be nitrogen.

The photocatalyst may have a crystalline structure. The photocatalyst may have a crystallite size range of between about 5 nm to about 50 nm. The photocatalyst may have a crystallite size range of between about 10 nm to about 30 nm.

The invention further provides a photocatalyst comprising mesoporous titanium dioxide with a band gap width of 2.9 eV. The photocatalyst may comprise undoped titanium dioxide.

In another aspect, the invention provides an antimicrobial composition comprising a photocatalyst as described herein.

The invention also provides a film or coating comprising a photocatalyst as described herein. The film or coating may be self cleaning. The film or coating may be antimicrobial.

The invention further provides an article comprising a film or coating as described herein. The article may be selected from one or more of an electrode, a medical device, a solar cell, and a tile.

In a further aspect, the invention provides the use of a photocatalyst as described herein in the preparation of an antimicrobial film or coating.

The invention also provides a process for forming a nanoporous crystalline material from an inorganic or organic precursor thereof comprising the steps of:
   (i) preparing a suspension from the inorganic or organic precursor; and
   (ii) utilising microwave irradiation, under non-pressurised conditions suitable to crystallise the material from the suspension, to crystallise the material from the suspension.

The suspension may be formed by the step of hydrolysing the inorganic or organic precursor from a solution thereof to precipitate an insoluble material. The suspension may comprise an aqueous suspension.

The nanoporous crystalline material may comprise an oxide of titanium, an oxide of zirconium, an oxide of zinc, an oxide of tungsten, an oxide of tin, barium titanate, barium strontianite, lead barium titanate, or lead zirconate. The nanoporous crystalline material may comprise titanium dioxide.

The precursor may be an organic precursor. The organic precursor may comprise a metal organic compound. The metal organic precursor may comprises a metal alkoxide. The metal organic precursor may comprise a titanium alkoxide. The metal alkoxide may comprise titanium isopropoxide.

The nanoporous crystalline material may be doped with a dopant material. The dopant material is present in said suspension. The dopant may be selected from the group consisting of phosphoric acid, ferric chloride, triethyl amine, trifluoroacetic acid, thiourea, silver nitrate, silver acetate, copper nitrate, copper sulphate, boric acid and combinations thereof. The process may further comprise the step of washing the nanoporous crystalline material to remove excess dopant material.

The power of the microwave radiation may be in the range from about 150 to about 1,200 Watts such as from about 300 to about 600 Watts.

The invention further provides use of microwave irradiation to crystallise a suspension of an inorganic or organic precursor of a nanoporous crystalline material under suitable conditions in a process for the formation a nanoporous crystalline material with a low energy band gap. The conditions suitable to crystallise the material may be non-pressurised conditions. The band gap energy of the nanoporous crystalline material may be reduced to allow electron excitation by light in the visible region of the electromagnetic spectrum. The nanoporous crystalline material may comprise titanium. A dopant material may be present as crystallisation occurs. The dopant material may reduce the band gap of the crystalline material. The nanoporous crystalline material may be a visible light active photocatalyst. The nanoporous crystalline material may have a surface area between about 100 $m^2/g$ and about 400 $m^2/g$. The nanoporous crystalline material may have a surface area between about 150 $m^2/g$ and about 350 $m^2/g$ such as between about 200 $m^2/g$ and about 300 $m^2/g$.

The term nanoporous is to be construed as including pores in the mesoporous range of 2-50 nm. The term non-pressurised conditions refers to substantially ambient pressure during formation of the materials in question. In this context the term non-pressurised does not include conditions where there is initial ambient pressure and thereafter a substantive increase in pressure such as may be achieved in a closed vessel, for example with applied heat or other energy. A closed vessel is one in which the atmosphere is sufficiently confined to cause a substantive pressure increase with heating. An open vessel is one in which the atmosphere is not sufficiently confined to cause a substantive pressure increase with heating. The term "visible light activatable" will be understood to mean that the photocatalyst is activated by exposure to light in the visible region of the electromagnetic spectrum such as light with a wavelength of 400 nm, for example light with a wavelength between 400 nm and 700 nm.

We describe a microwave assisted low temperature process for manufacturing visible light active nanoporous metal oxide photocatalysts in particular those with a low energy band gap.

Pure and doped nanocrystalline metal oxides were prepared by a low temperature (~100° C.) microwave method in an open vessel at atmospheric pressure without using acids, bases, is electrolytes, surfactants and flammable liquids. In a typical experiment hydrous amorphous $TiO_2$ was produced by the hydrolysis of titania precursor using heated, for example, boiling water. The suspension formed was then microwave treated to get nanocrystalline powder. Different dopants and co-dopants were also used to tune the band gap for visible light photocatalysis:

The microwave method of the present invention is advantageous because of the following reasons
1. Crystalline size of the oxides can be controlled by adjusting microwave power and exposure time.
2. It provides a means of low temperature (~100° C.) synthesis of nanocrystalline oxides and controlling the band gap by doping and co-doping.
3. This process takes less time compared to conventional methods.
4. It is an energy efficient (green) method.
5. It can be operated at ambient pressure.

The low energy requirements of the method, the safety and low cost associated with operating the method at ambient pressure and the environmentally friendly nature of the process all combine to make the process very attractive from an industrial scale-up perspective.

In one aspect the invention relates to a process for forming a nanoporous crystalline material from an inorganic or organic precursor thereof comprising the steps of:
i) preparing a suspension from the inorganic or organic precursor; and
ii) utilising microwave irradiation, under non-pressurised conditions suitable to crystallise the material from the suspension, to crystallise the material from the suspension.

The suspension may be formed by the step of hydrolysing the inorganic or organic precursor from a solution thereof to precipitate an insoluble material. Preferably, the suspension may comprise an aqueous suspension. The process may be carried out in an environmentally friendly medium, such as water. The use of volatile organic solvents can be avoided. The method may be performed under substantially neutral pH conditions.

We further describe a process for forming a nanoporous crystalline material from organic precursor thereof. The said organic precursor may comprise a metal organic compound, in particular a metal alkoxide. Suitable precursor materials comprise metal methoxides, ethoxides, propoxides, iso-propoxides, butoxides and combinations thereof. Suitable metals comprise titanium, zirconium, zinc, tin, tungsten, lead and combinations thereof. Desirably the metal alkoxide comprises a titanium alkoxide for example titanium isopropoxide.

Suitable nanoporous crystalline materials that can be produced by the process described herein include an oxide of titanium, an oxide of zirconium, an oxide of zinc, an oxide of tungsten, an oxide of tin, barium titanate, barium strontianite, lead barium titanate, or lead zirconate. More desirably, the nanoporous crystalline material may comprise titanium dioxide.

The process further extends to preparing a nanoporous crystalline material, doped with a dopant material. The same low temperature, energy efficient process can be used to synthesise doped and undoped nanocrystalline oxides. In general, the dopant material may be incorporated into the suspension prior to treatment with microwave irradiation.

The dopant material may be present as crystallisation occurs and the dopant material reduces the band gap of the crystalline material. The method is versatile with respect to the nature of the dopant. The dopant material can be selected from the group consisting of phosphoric acid, ferric chloride, triethyl amine, trifluoroacetic acid, thiourea, silver nitrate, silver acetate, copper nitrate, copper sulphate, boric acid and combinations thereof.

Dopants can be selected from the group consisting of anionic dopants, cationic dopants, metal dopants and combinations thereof.

The process may comprise treating said suspension, prepared from an inorganic or organic precursor thereof, with microwave irradiation in a conventional microwave oven. The power of the microwave radiation may be in the range of about 150 to about 1,200 Watts, more desirably in the range about 300 to about 600 Watts. Desirably, the suspension being subjected to the microwave irradiation may be in an open top vessel. Thus, the expense associated with controlling and monitoring the pressure within the vessel and utilising apparatus compatible with high-pressure conditions is not an issue.

The invention further extends to the use of microwave irradiation to crystallise a suspension of an inorganic or organic precursor of a nanoporous crystalline material under suitable conditions in a process for the formation a nanoporous crystalline material with a low energy band gap. Conditions suitable to crystallise the material are non-pressurised conditions.

In a further aspect, the band gap of the crystalline materials may be reduced through doping as hereinbefore described. Desirably, the band gap energy of the nanoporous crystalline materials produced by this method may be reduced to allow electron excitation by light in the visible region of the electromagnetic spectrum. Thus, materials produced by this low cost energy efficient process may be suitable as visible light active photocatalysts.

In addition to producing nanoporous crystalline materials with a low energy band gap, the process may also produce nanoporous crystalline materials possessing desirable characteristics such as large surface area per gram and defined crystallite size. Crystalline size of the oxides may be controlled by adjusting microwave power and exposure time.

Desirably, the nanoporous crystalline material may have a surface area between about 100 $m^2/g$ and about 400 $m^2/g$, further desirably between about 150 $m^2/g$ and about 350 $m^2/g$, for example between about 200 $m^2/g$ and about 300 $m^2/g$.

Preferably, the nanoporous material may have a crystalline size ranging between about 5 and about 50 nm, for example between about 10 and about 30 nm.

The nanoporous crystalline materials produced by the process described herein may be doped, the dopant may be selected from the group consisting of phosphorous, iron, nitrogen, fluorine, sulfur, boron, silver, copper and combinations thereof.

Desirably, the nanoporous crystalline materials produced by the process described herein may comprise an oxide of titanium, and for example comprise anatase titanium dioxide.

Materials produced by the process described herein may possess many desirable characteristics and for example may be utilised as:
1. photocatalysts, for example visible light active photocatalysts;
2. films or coatings applied to substrates, for example for use in electrode structures;
3. coatings for medical devices;
4. catalysts;
5. solar cells; and
5. cleaning agents.

BRIEF DESCRIPTION OF THE DRAWING

The invention will be more clearly understood from the following description of an embodiment thereof, given by way of example only, with reference to the accompanying drawings, in which.

DETAILED DESCRIPTION

Figure 25:
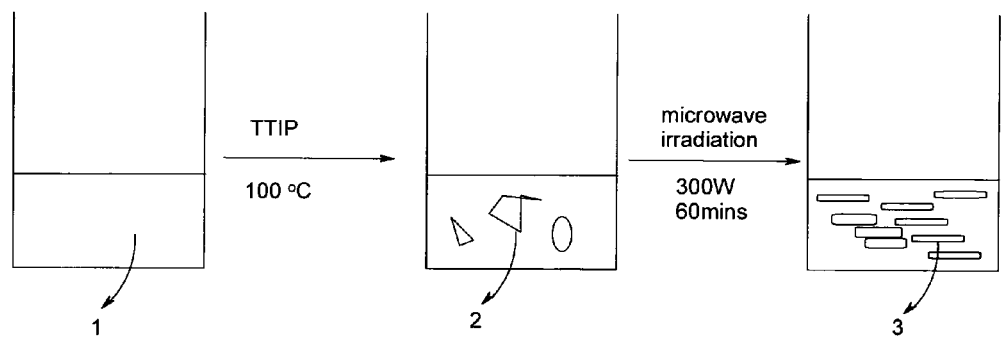
FIG. 25 is a schematic showing the general steps for microwave synthesis of a photocatalyst in accordance with an embodiment of the invention.

A general schematic for the preparation of nanoporous crystalline titania is illustrated in FIG. 25. Water 1 is heated to 100 degrees centigrade in an open top vessel. To this Titanium tetraisopropoxide (TTIP) is added. Hydrolysis of the Titanium-tetraisopropoxide and, subsequent cross-linking results in hydrated titanium oxide precipitating out of solution 2. The resulting suspension is subjected to microwave irradiation at 300 W for a period of 60 minuets to yield nanoporous crystalline titania with a low energy band gap 3.

We describe a process for manufacturing nanoporous crystalline materials and the materials thus produced. The process is suitable for synthesising conducting oxides such as metal (for example titania) oxides. The term nanoporous includes porous material porous material with substantially all pores less than 100 nm in diameter. The nanoporous materials may have specific desirable properties. Different forms of materials are possible, for example films and coatings.

Pure and doped low band gap titania nanopowders were prepared by a low temperature microwave assisted method. The process is performed at ambient pressure and there is no requirement to use a pressurised atmosphere. This means that the process can be carried out utilising a solution held in an unpressurised vessel. The process can be carried out in an unsealed vessel. Indeed the vessel can be open to the atmosphere, for example an open-top vessel.

The invention will be more clearly understood from the following examples.

EXAMPLES

Example 1

Microwave Assisted (Low Temperature) Synthesis of Nanocrystalline $TiO_2$

Figure 1:
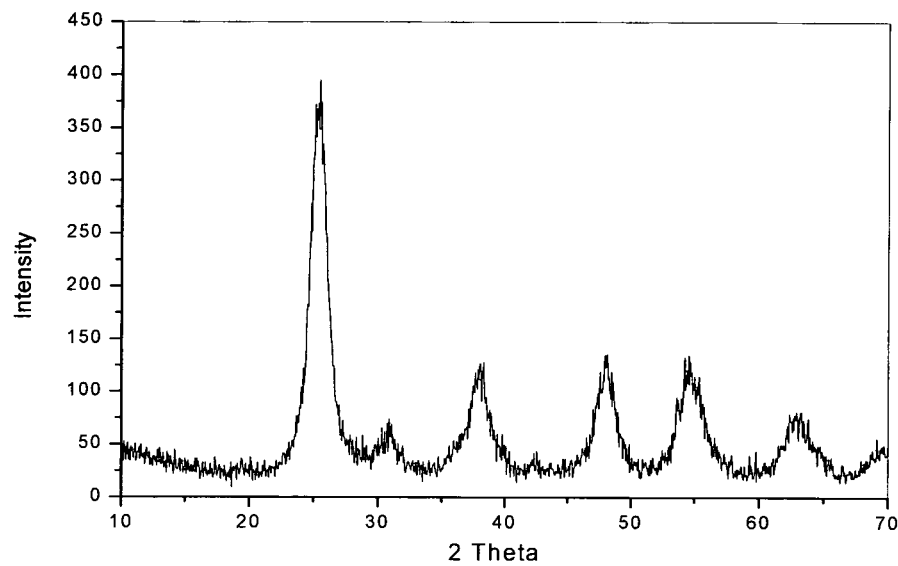
FIG. 1 is an X-ray diffraction pattern of undoped titanium dioxide photocatalyst synthesised using a microwave method.

Experimental 7.5 ml of titanium (IV) isopropoxide was added to 75 ml boiling water with constant stirring (volume ratio between TTIP and water was fixed as 1:10 in all preparations). Precipitated hydrated titanium oxide were stirred for 30 minutes, and treated with microwave radiations of power 300 W for 60 minutes. It was then filtered, dried in an oven at 80° C. to form a powder. An X-ray diffraction pattern of the powder is given in FIG. 1.

X-Ray Diffraction Studies

High intensity broad peaks in the X-ray diffraction pattern indicate the formation of nanocrystalline anatase titania. The average crystallite size D was 6.1 nm determined according to the Scherrer equation $D=K\lambda/\beta \cos \theta$ where k is a constant (shape factor, about 0.9); 1 is the X-ray wavelength; $\beta$ is the full width at half-maximum of the diffraction line and $\theta$ is the diffraction angle. The values of $\beta$ and $\theta$ are from the anatase (1 0 1) diffraction line.

UV-Vis Spectroscopic study of Titania Nanopowder

Figure 2:
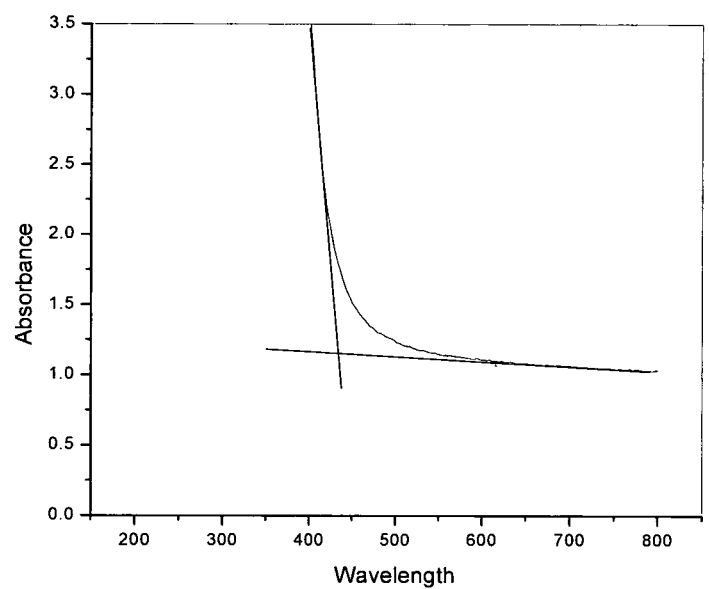
FIG. 2 is a UV-VIS absorption spectrum of the undoped titanium dioxide photocatalyst of FIG. 1.
Figure 3:
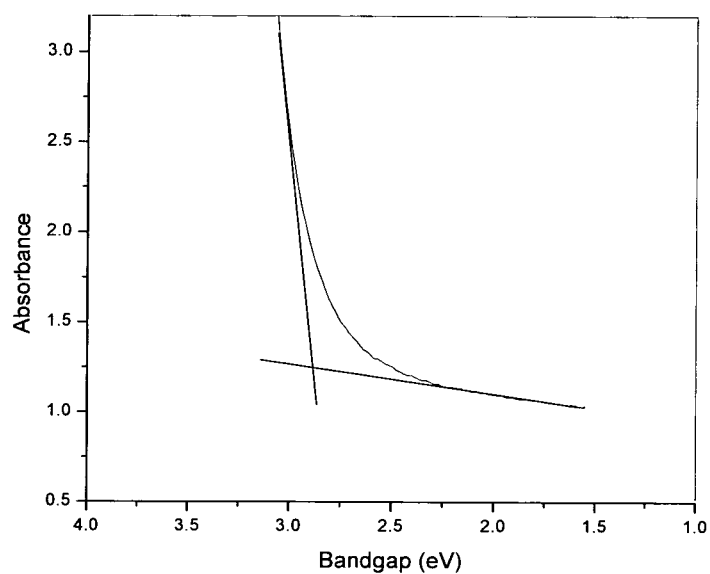
FIG. 3 is a plot showing the band gap (eV) determination of the undoped titanium dioxide photocatalyst of FIG. 1.

Titania nanopowder samples as prepared above were made in to pellets having uniform thickness of 3 mm using a hydraulic press. It will be appreciated the titania material is undoped. Absorbance spectra were taken using Perkin Elmer Lambda 900 UV/VIS Spectrometer. The absorbance spectrum is set out in FIG. 2. Undoped sample shows an absorption maximum of 428 nm. This corresponds to a band gap of 2.9 eV. Band gap was calculated by plotting absorbance against corresponding electron volt as shown in FIG. 3.

Figure 4:
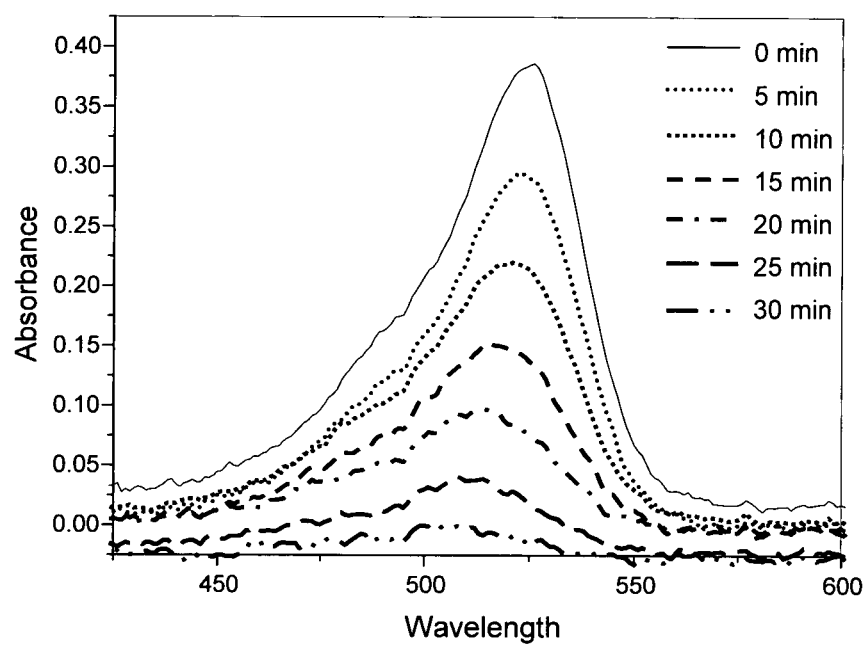
FIG. 4 is a UV absorbance spectrum of undoped titanium dioxide photocatalyst/rhodamine 6G solution over time.

Photocatalytic Study of Titania Nanopowder Prepared by Microwave Treatment 0.06 gram of titania nanopowder as prepared above was mixed with 50 ml of $10^{-6}$ molar rhodamine 6 G solution in a 100 ml beaker. It was then irradiated with UV light of power 0.68 $W/m^2$ at 28° C. in a Q-sun chamber with stirring. UV spectrum of the samples was taken at a regular intervals using Perkin Elmer Lambda 900 UV-VIS Spectrometer. Rhodamine 6 G shows an absorption max at 522 nm. Absorbance decreases and rhodamine 6 G solution become colourless after 30 minutes UV treatment. This is shown by the successive plots taken at 5 minute intervals in FIG. 4 which shows the successive decrease in absorbance at 522 nm during those intervals for the solution. The sequence of plots in FIG. 4 shows that the photoactivity of the respective titania solutions increases with increased doping amounts as the time taken for depletion of the Rhodamine 6G material decreases with increasing doping. The depletion of Rhodamine 6G is demonstrated by the decreasing intensity of absorbance within the solutions.

Example 2

Microwave Assisted Synthesis of Phosphoric Acid Modified Titania

Phosphoric acid modified nanocrystalline titania powder was prepared by a microwave assisted method in an open container using a very low power (300 W) for 60 min. Molar ratios between titanium isopropoxide and phosphoric acid used were 1:0 (undoped/control), 1:0.05, 1:0.1, 1:0.15, 1:0.2, and 1:0.25.

Figure 5:
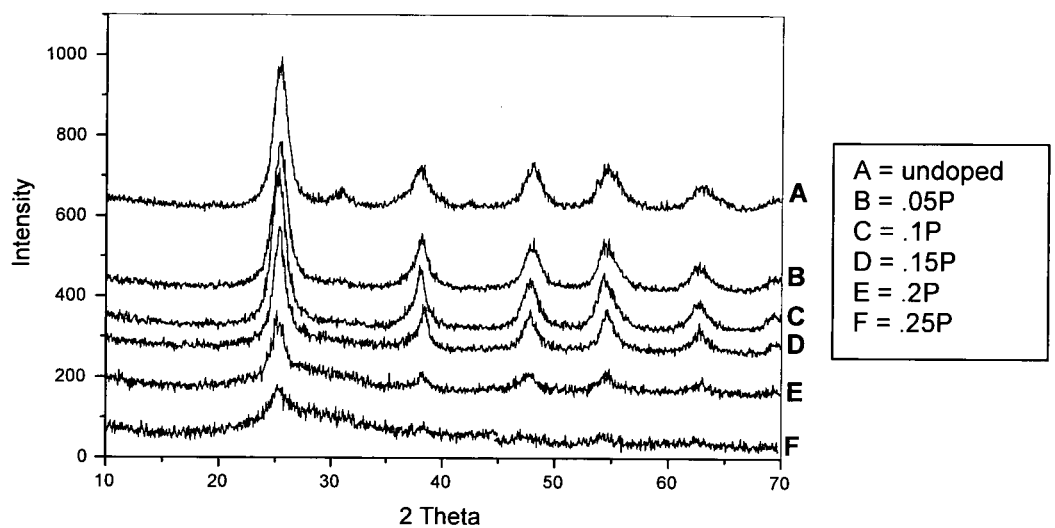
FIG. 5 is an X-ray diffraction pattern of undoped titanium dioxide photocatalyst and phosphoric acid doped titanium dioxide photocatalyst synthesised using a microwave method.

Experimental 7.5 ml of titanium (IV) isopropoxide was added to 75 ml boiling water containing phosphoric acid with constant stirring. Precipitated hydrated titanium oxide were stirred for 30 minutes, and treated with microwave radiations of power 300 W for 60 minutes. It was then washed, dried in an oven at 80° C. and powdered well. X-ray diffraction pattern was then taken of the powder. This was repeated with the respective ratios of titanium isopropoxide:phosphoric acid as set above. The respective UV spectra of the powders are set out in FIG. 5. The top trace in FIG. 5 represents an undoped control. Each successive trace (moving from top to bottom) represents respectively the spectrum for the 1:0.05, 1:0.1, 1:0.15, 1:0.2, and 1:0.25.

UV-Visible Spectroscopic Studies

Figure 6:
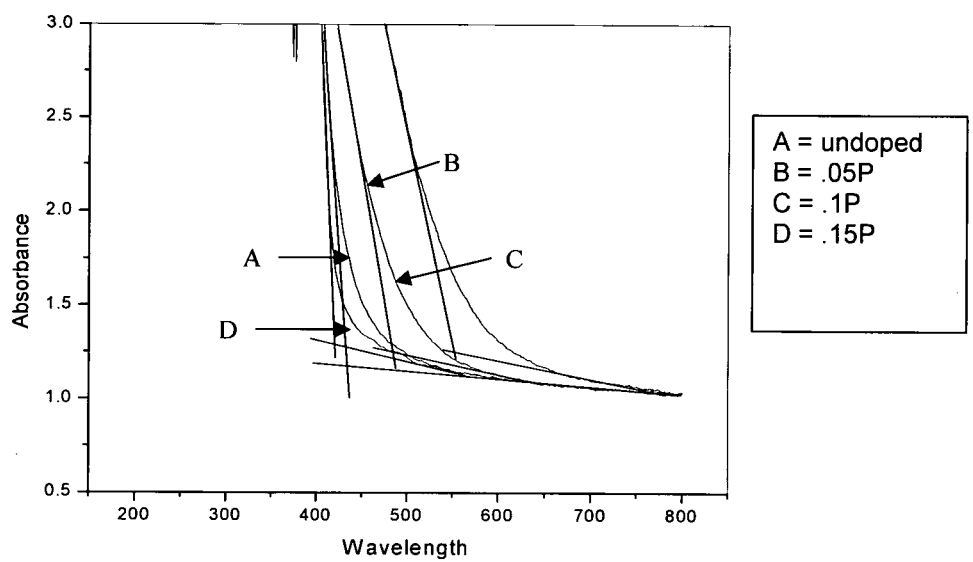
FIG. 6 is a UV-VIS absorption spectrum of the undoped titanium dioxide photocatalyst and phosphoric acid doped titanium dioxide photocatalyst of FIG. 5.
Figure 7:
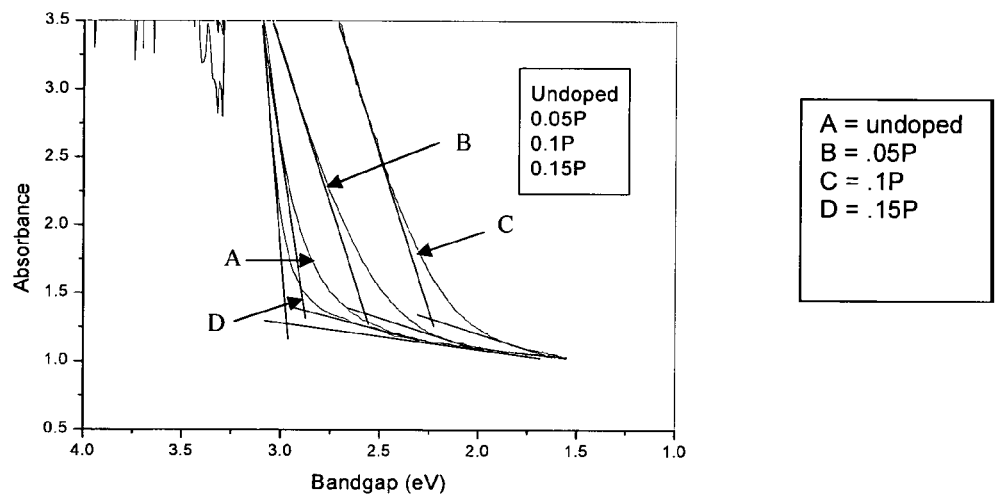
FIG. 7 is a plot showing the band gap (eV) determination of the undoped titanium dioxide photocatalyst and phosphoric acid doped titanium dioxide photocatalyst of FIG. 5.

Respective phosphoric acid modified titania nanopowder samples as prepared above were made into pellets having uniform thickness of 3 mm using a hydraulic press. Absorbance spectra were taken using Perkin Elmer Lambda 900 UV/VIS Spectrometer and the respective traces for the samples are set out in FIG. 6. Phosphoric acid modified samples show strong absorption in the visible region. Moving from right to left the first plot is the 1:0.1 sample, the second the 1:0.05 sample, the third the undoped control, and the fourth the 1:0.15 sample. The decrease in band gap energy for 1:0.05 and 1:0.1 P doped titania is believed attributable to the change in pH resulting in anatase titania. It is believed that the small quantity of P in these cases does not contribute to the band gap energy. 1:0.15 P doping illustrates the normal behaviour associated with P doping i.e. the band gap increases in energy. Band gap of samples were calculated by, plotting absorbance against corresponding electron volts. The respective band gap measurements are set out in FIG. 7 where again moving from right to left the first plot is the 1:0.1 sample, the second the 1:0.05 sample, the third the undoped control, and the fourth the 1:0.15 sample.). Relevant values from FIGS. 6 and 7 are respectively set out in Table 1 below.

TABLE 1

UV-visible spectroscopic properties of phosphoric acid doped titanium dioxide

| Photocatalyst | Wavelength $\lambda_{max}$ (nm) | Band gap (eV) |
|---|---|---|
| Undoped $TiO_2$ | 428 | 2.90 |
| 1 $TiO_2$:0.05 P doped | 482 | 2.43 |
| 1 $TiO_2$:0.1 P doped | 551 | 2.12 |
| 1 $TiO_2$:0.15 P doped | 419 | 2.94 |

Figure 8:
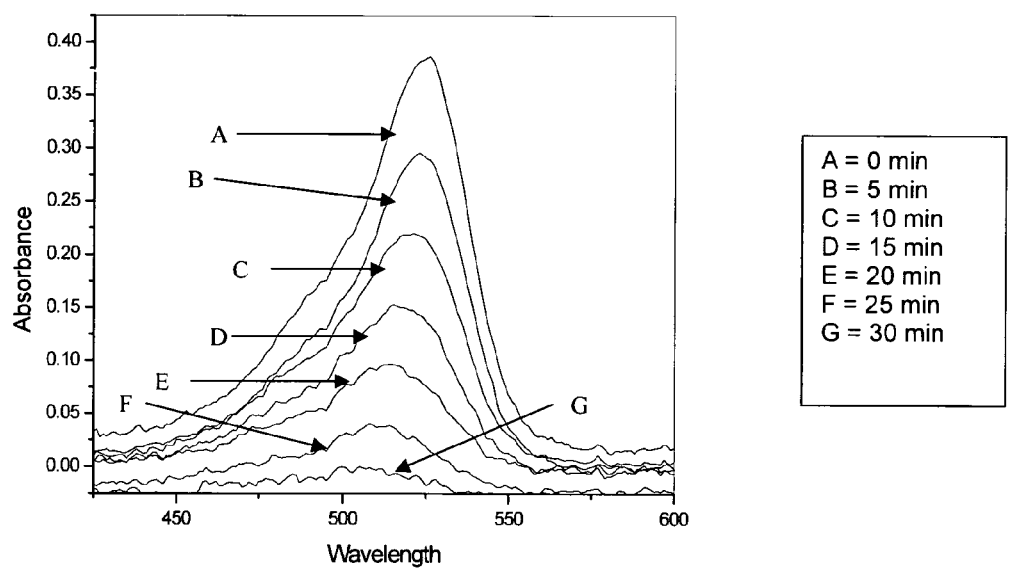
FIG. 8 is a UV absorbance spectrum of undoped titanium dioxide photocatalyst/rhodamine 6G solution over time.
Figure 9:
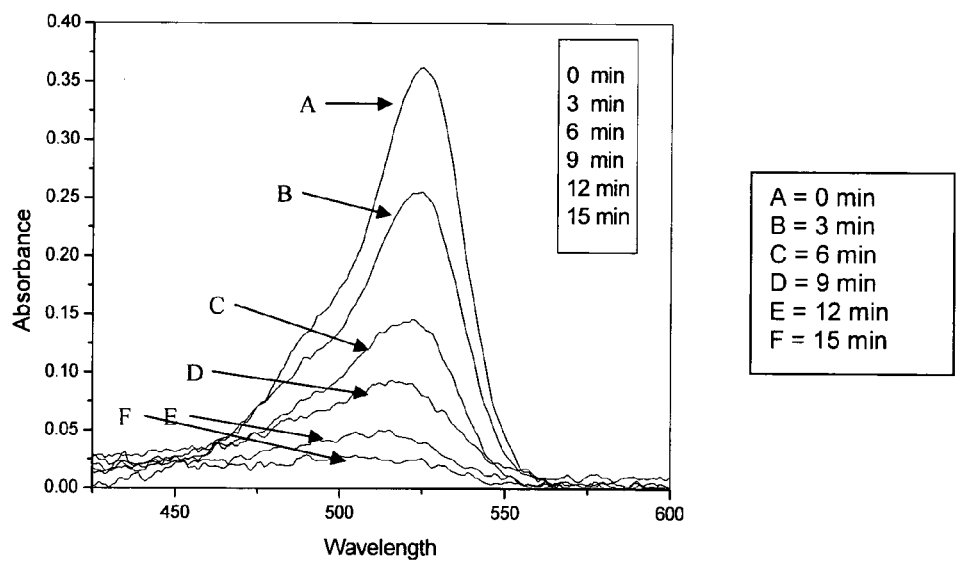
FIG. 9 is a UV absorbance spectrum of phosphoric acid doped (1:0.05P) titanium dioxide photocatalyst/rhodamine 6G solution over time.
Figure 10:
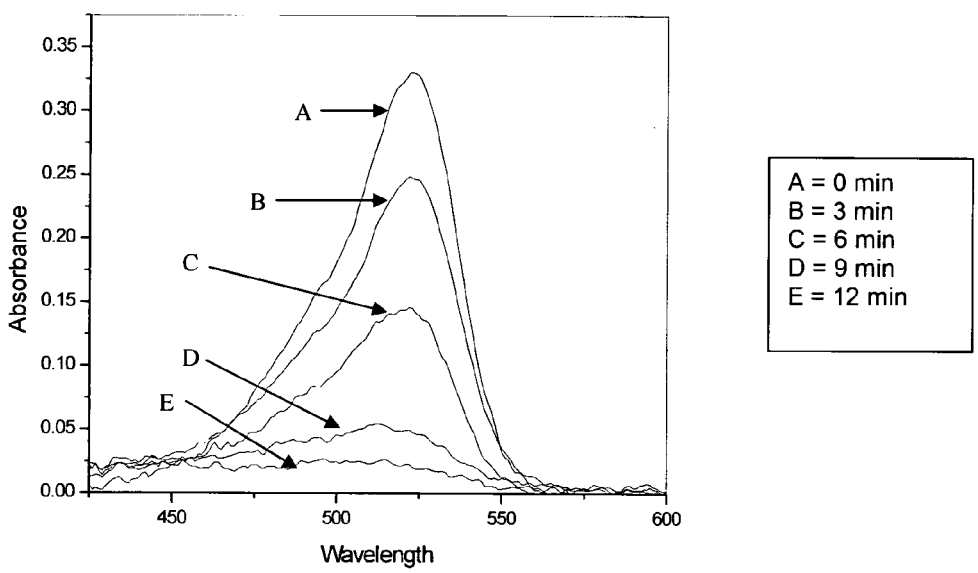
FIG. 10 is a UV absorbance spectrum of phosphoric acid doped (1:0.1P) titanium dioxide photocatalyst/rhodamine 6G solution over time.

Photocatalytic Study of Phosphoric Acid Modified Titania Nanopowder 0.06 gram of titania nanopowder was mixed with 50 ml of $10^{-6}$ molar rhodamine 6 G solution in a 100 ml beaker. It was then irradiated with UV light of power 0.68 W/m² at 28° C. in a Q-sun chamber with stirring. UV spectrum of the samples was taken at a regular intervals using Perkin Elmer Lambda 900 UV/VIS Spectrometer. Rhodamine 6 G shows an absorption max at 522 nm. Absorbance decreases and rhodamine 6 G solution become colourless on UV treatment. FIGS. 8-10 show the respective time traces. FIG. 8 shows the spectrum for undoped titania nanopowder at regular intervals starting with 0 minutes as the top trace and moving downwards the following traces at 5 minute intervals. FIG. 9 shows the UV Spectrum of Phosphorous modified titania (1:0.05P) nanopowder at regular intervals starting with 0 minutes as the top trace and moving downwards the following traces at 3 minute intervals. FIG. 10 shows the UV Spectrum of Phosphorous modified titania (1:0.1P) nanopowder at regular intervals. The sequence of Figures shows that the photoactivity of the respective titania solutions increases with increased doping amounts as the time taken for depletion of the Rhodamine 6G material decreases with increasing doping. The depletion of Rhodamine 6G is demonstrated by the decreasing intensity of absorbance within the solutions.

Example 3

Microwave Assisted Synthesis of Iron Doped Titania

Figure 11:
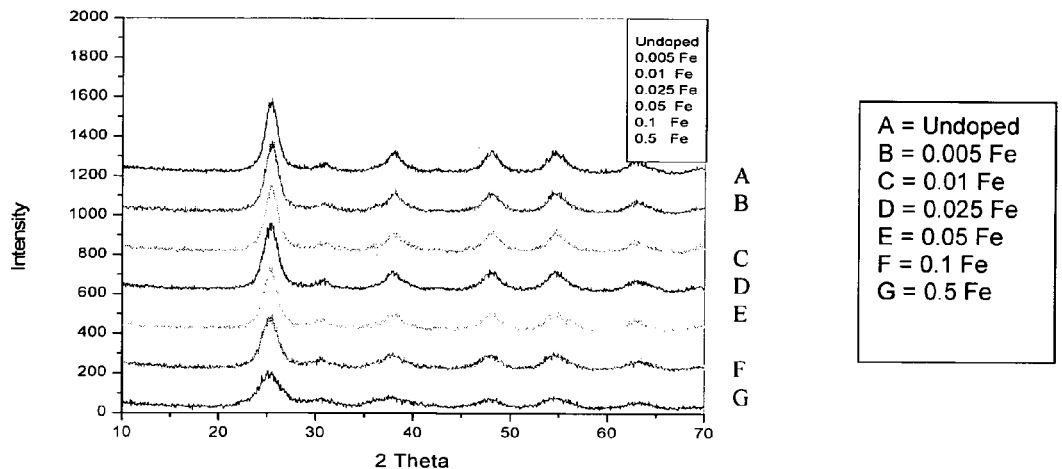
FIG. 11 is an X-ray diffraction pattern of undoped titanium dioxide photocatalyst and iron doped titanium dioxide photocatalyst synthesised using a microwave method.
Figure 12:
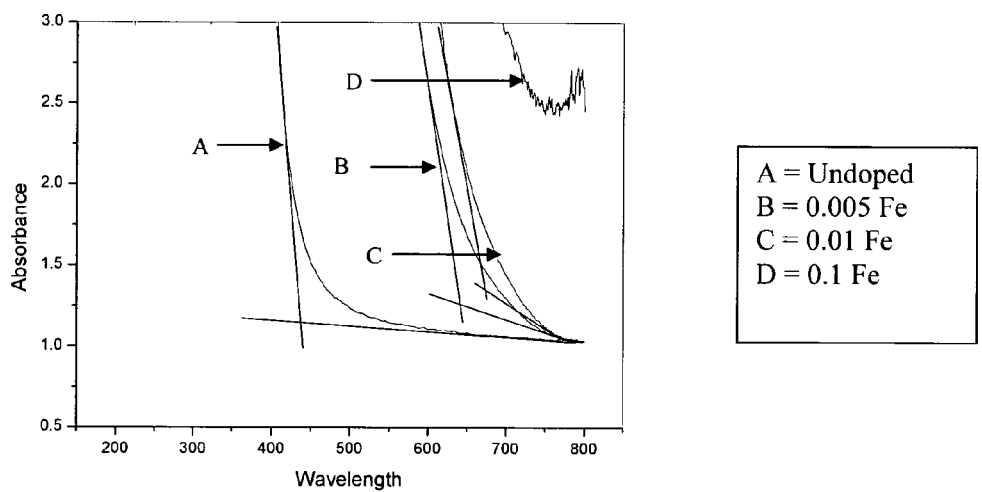
FIG. 12 is a UV-VIS absorption spectrum of the undoped titanium dioxide photocatalyst and iron doped titanium dioxide photocatalyst of FIG. 11.
Figure 13:
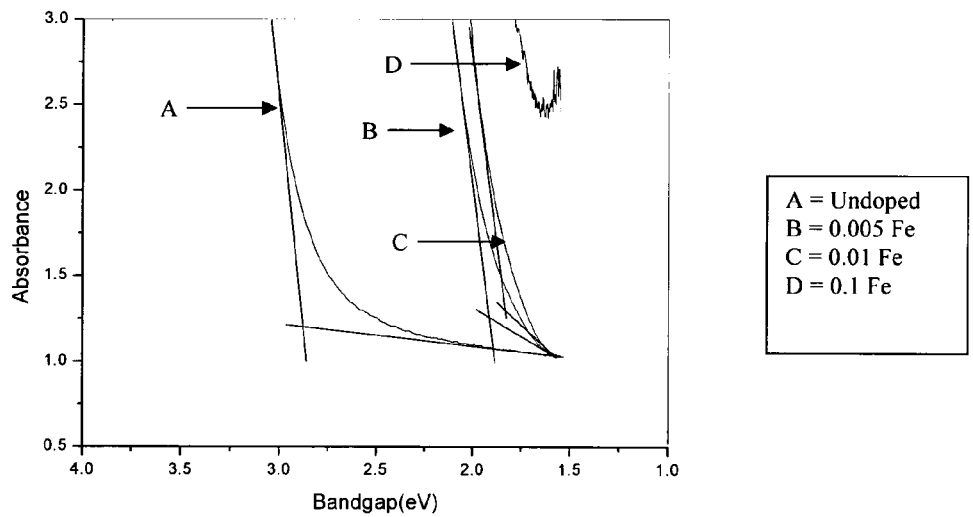
FIG. 13 is a plot showing the band gap (eV) determination of the undoped titanium dioxide photocatalyst and iron doped titanium dioxide photocatalyst of FIG. 11.

Iron doped nanocrystalline titania powder was prepared by a microwave assisted method in an open vessel (100 ml glass beaker) using a very low power (300 W) for 60 min. Molar ratios between titanium isopropoxide and iron precursor used were 1:0, 1:0.005, 1:0.01, 1:0.025, 1:0.05, 1:0.1 and 1:0.5.
Experimental
7.5 ml of titanium (IV) isopropoxide was added to 75 ml boiling water containing different amounts of ferric chloride (as iron source) with constant stirring. Precipitated hydrated titanium oxide was stirred for 30 minutes, and treated with microwave radiations of power 300 W for 60 minutes. These materials were then washed, dried in an oven at 80° C. and powdered well. X-ray diffraction pattern of the powders are given in FIG. 11. The top trace in FIG. 11 represents an undoped control. Each successive trace (moving from top to bottom) represents respectively the spectrum for the 1:0.005, 1:0.01, 1:0.025, 1:0.05, 1:0.1 and 1:0.5.
UV-Visible Spectroscopic Studies
Titania nanopowder samples (doped with Fe as described above) were made in to pellets having uniform thickness of 3 mm using a hydraulic press. Absorbance spectra were taken using Perkin Elmer Lambda 900 UV/VIS Spectrometer. The results are set out in FIG. 12. The left-hand trace in FIG. 11 represents an undoped control. Each successive trace (moving from left to right) represents respectively the spectrum for the 1:0.005, 1:0.01, and 1:0.1. As can be seen samples containing small amounts of iron show strong absorption in the visible region. Sample containing high amount of iron (1:0.1 Fe) shows a broad and weak absorption due to less crystallinity. Band gap of samples was calculated by plotting absorbance against corresponding electron volts. The results are set out in FIG. 13.

TABLE 2

UV-visible spectroscopic properties of iron doped titanium dioxide

| Photocatalyst | Wavelength $\lambda_{max}$ (nm) | Band gap (eV) |
|---|---|---|
| Undoped $TiO_2$ | 428 | 2.90 |
| 1 $TiO_2$:0.005 Fe doped | 640 | 1.90 |
| 1 $TiO_2$:0.01 Fe doped | 673 | 1.82 |

Figure 14:
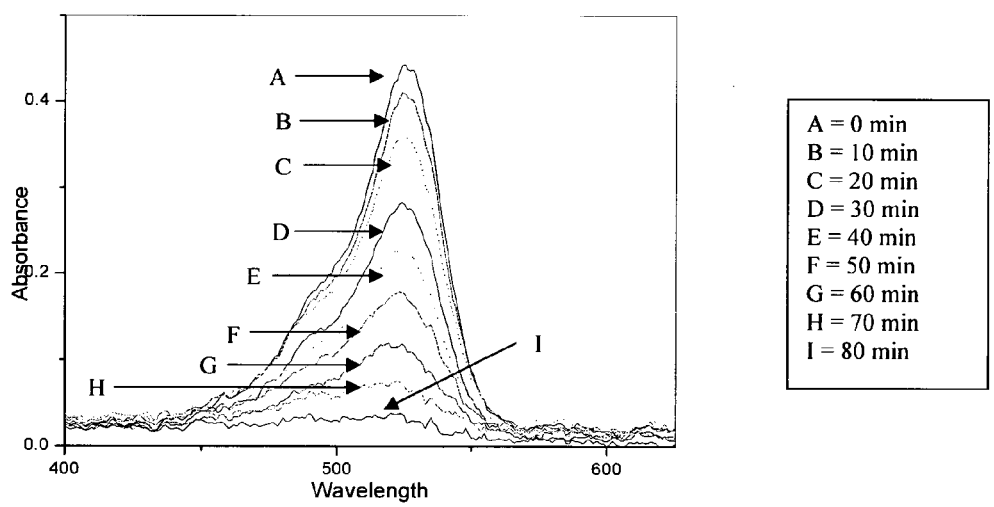
FIG. 14 is a UV absorbance spectrum of iron doped (1:0.005Fe) titanium dioxide photocatalyst/rhodamine 6G solution over time.
Figure 15:
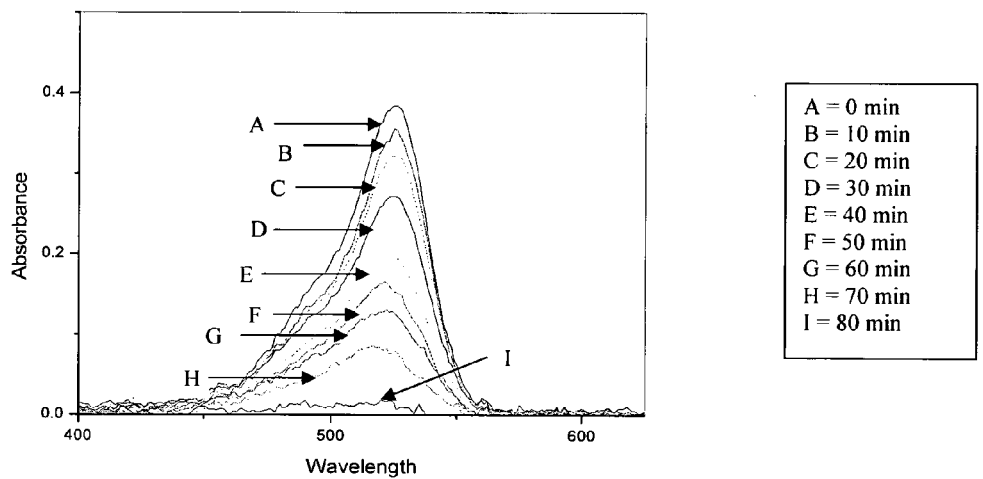
FIG. 15 is a UV absorbance spectrum of iron doped (1:0.01Fe) titanium dioxide photocatalyst/rhodamine 6G solution over time.

Photocatalytic Study of Iron Doped Titania Nanopowder 0.06 gram of titania nanopowder was mixed with 50 ml of $10^{-6}$ molar rhodamine 6 G solution in a 100 ml beaker. It was then irradiated with UV light of power 0.68 W/m² at 28° C. in a Q-sun chamber with stirring. UV spectrum of the samples was taken at a regular intervals using Perkin Elmer Lambda 900 UV/VIS Spectrometer. Rhodamine 6 G shows an absorption max at 522 nm. Absorbance decreases and rhodamine 6 G solution become colourless on UV treatment for the respective solutions as shown in FIGS. 14 and 15. FIG. 14 shows a UV Spectrum of Iron doped titania (1:0.005Fe) nanopowder/rhodamine 6G solution at regular (10 minute) intervals. The top trace in FIG. 14 represents an undoped control. Each successive trace (moving from top to bottom) represents respectively the spectrum for each subsequent 10 minute interval. FIG. 15 shows a UV Spectrum of Iron doped titania (1:0.005Fe) nanopowder/rhodamine 60 solution at regular (10 minute) intervals. The top trace in FIG. 15 represents an undoped control. Each successive trace (moving from top to bottom) represents respectively the spectrum for each subsequent 10 minute interval.

Example 4

Microwave Assisted Synthesis of Nitrogen Doped Titania

Figure 16:
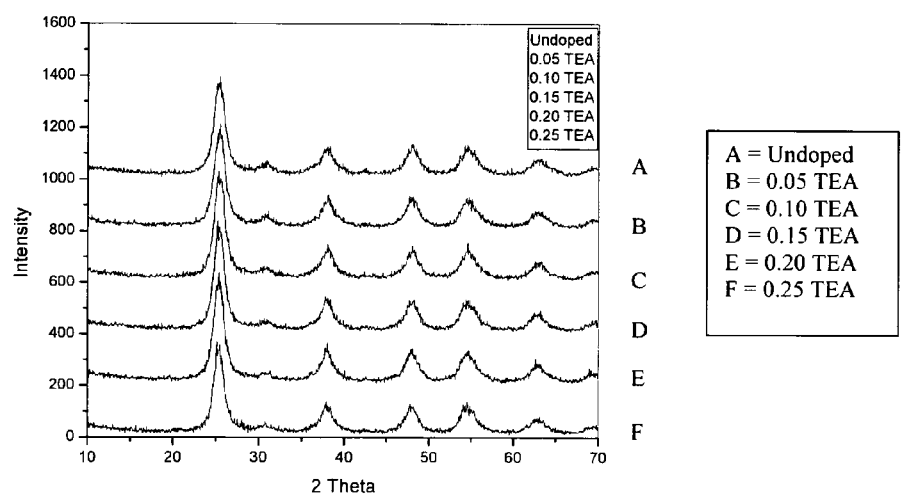
FIG. 16 is an X-ray diffraction pattern of undoped titanium dioxide photocatalyst and nitrogen doped titanium dioxide photocatalyst synthesised using a microwave method.

Nitrogen doped nanocrystalline titania powder was prepared by a microwave assisted method in an open vessel (100 ml glass beaker) using a very low power (300 W) microwave energy for 60 min. Molar ratios between titanium isopropoxide and Nitrogen precursor (Triethyl amine) used were 1:0, 1:0.05, 1:0.1, 1:0.15, 1:0.2 and 1:0.25.
Experimental
7.5 ml of titanium (IV) isopropoxide was mixed with different amounts (see ratios above) of triethyl amine (as nitrogen source) and added to 75 ml boiling water with constant stirring. Precipitated hydrated titanium oxide was stirred for 30 minutes, and treated with microwave radiations of power 300 W for 60 minutes in an open beaker. These materials were then washed, dried in an oven at 80° C. and the resulting material was powdered well. This result in the formation of pale yellow coloured nitrogen doped nanocrystalline titania powders. X-ray diffraction pattern of the powders are given in FIG. 16. The top trace in FIG. 16 represents an undoped control. Each successive trace (moving from top to bottom)

represents respectively the spectrum for each subsequent doped sample respectively 1:0.05, 1:0.1, 1:0.15, 1:0.2 and 1:0.25.

UV-Visible Spectroscopic Studies

Figure 17:
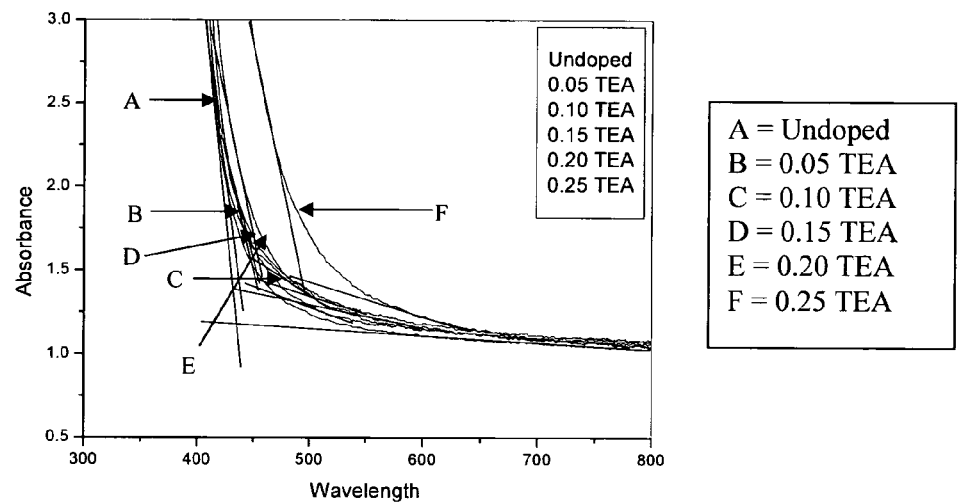
FIG. 17 is a UV-VIS absorption spectrum of the undoped titanium dioxide photocatalyst and nitrogen doped titanium dioxide photocatalyst of FIG. 16.

Titania nanopowder samples (as prepared above) were made in to pellets having uniform thickness of 3 mm using a hydraulic press. Absorbance spectra were taken using Perkin Elmer Lambda 900 UV/VIS Spectrometer. The respective spectra for the samples are shown in FIG. 17. The trace furthermost to the left represents the undoped control. Each successive trace (moving from left to right) represents respectively the spectrum of each subsequent doped sample respectively 1:0.05, 1:0.1, 1:0.15, 1:0.2 and 1:0.25. Nitrogen doped samples shows strong absorption in the visible region.

Figure 18:
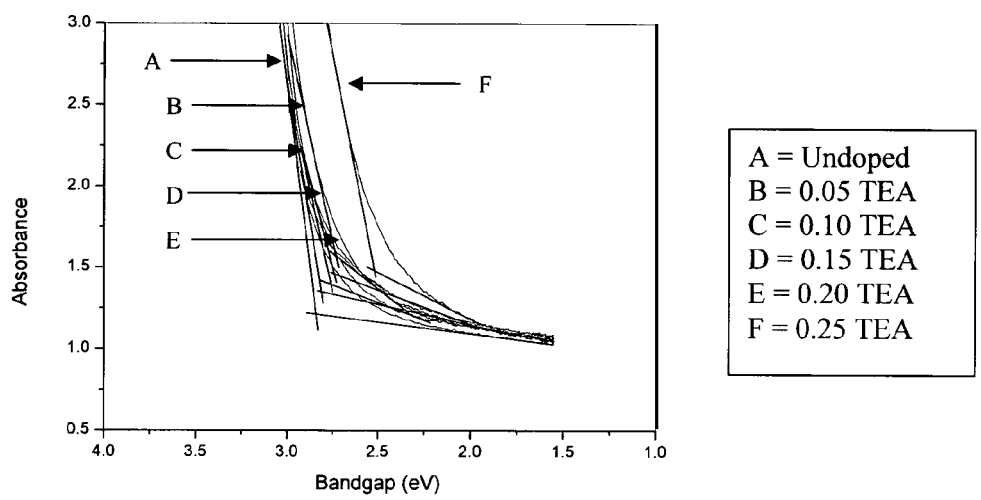
FIG. 18 is a plot showing the band gap (eV) determination of the undoped titanium dioxide photocatalyst and nitrogen doped titanium dioxide photocatalyst of FIG. 11.
Figure 19:
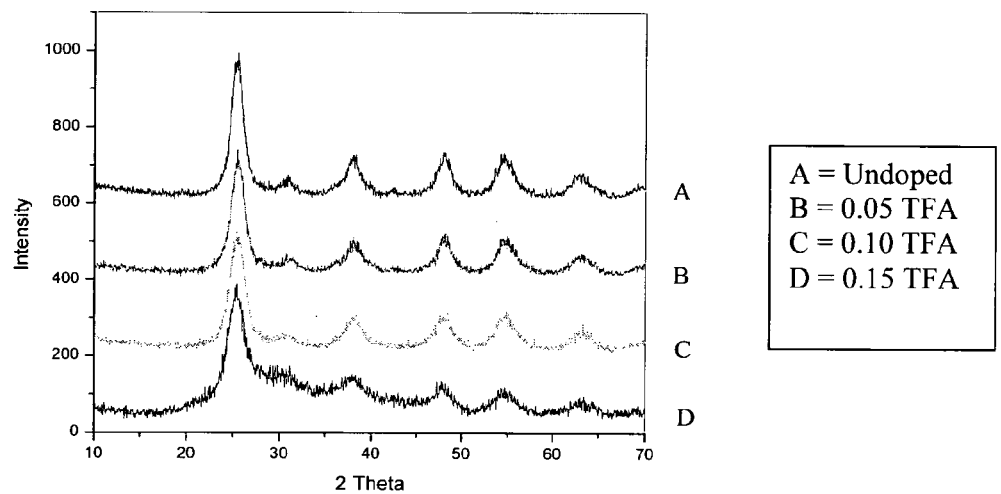
FIG. 19 is an X-ray diffraction pattern of undoped titanium dioxide photocatalyst and fluorine doped titanium dioxide photocatalyst synthesised using a microwave method.

Band gap of the respective samples was calculated by plotting absorbance against corresponding electron volts. This information is set out in FIG. 18. The maximum absorbance wavelength and the band gap values are set out in Table 3.

TABLE 3

UV-visible spectroscopic properties of nitrogen doped titanium dioxide

| Photocatalyst | Wavelength $\lambda_{max}$ (nm) | Band gap (eV) |
|---|---|---|
| Undoped $TiO_2$ | 428 | 2.90 |
| 1 $TiO_2$:0.05 TEA doped | 439 | 2.82 |
| 1 $TiO_2$:0.10 TEA doped | 451 | 2.73 |
| 1 $TiO_2$:0.15 TEA doped | 453 | 2.72 |
| 1 $TiO_2$:0.20 TEA doped | 455 | 2.71 |
| 1 $TiO_2$:0.25 TEA doped | 493 | 2.51 |

Example 5

Microwave Assisted Synthesis of Fluorine Doped Titania

Fluorine doped nanocrystalline titania powder was prepared by a microwave assisted method in an open vessel (100 ml glass beaker) using a very low power (300 W) microwave energy for 60 min. Molar ratios between titanium isopropoxide and fluorine precursor (Trifluoro acetic acid) used were 1:0, 1:0.05, 1:0.1 and 1:0.15.

Experimental 7.5 ml of titanium (IV) isopropoxide was mixed with different amounts (see the ratios set out above) of trifluoroacetic acid (as fluorine source) and added to 75 ml boiling water with constant stirring. Precipitated hydrated titanium oxide was stirred for 30 minutes, and treated with microwave radiations of power 300 W for 60 minutes in an open beaker. These materials were then washed, dried in an oven at 80° C. and the resulting material was powdered well. This result in the formation of fluorine doped nanocrystalline titania powders.

UV-Visible Spectroscopic Studies

Figure 20:
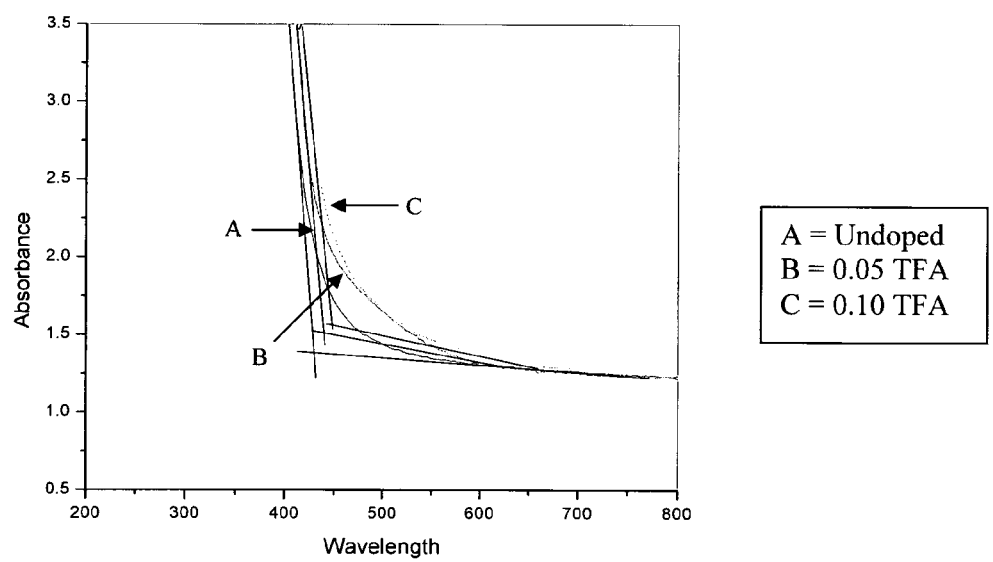
FIG. 20 is a UV-VIS absorption spectrum of the undoped titanium dioxide photocatalyst and fluorine doped titanium dioxide photocatalyst of FIG. 19.
Figure 21:
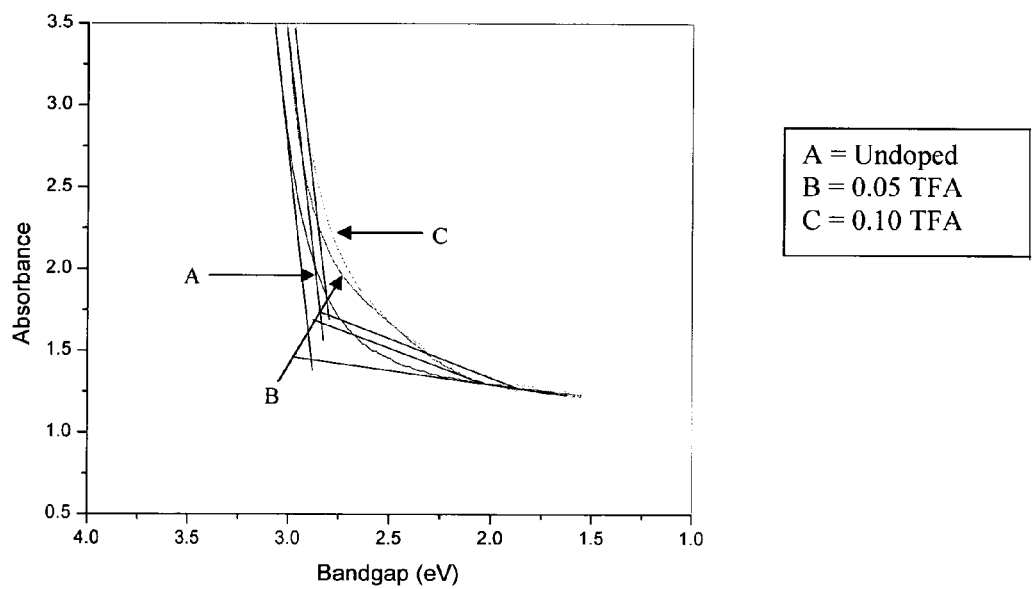
FIG. 21 is a plot showing the band gap (eV) determination of the undoped titanium dioxide photocatalyst and fluorine doped titanium dioxide photocatalyst of FIG. 19.

Titania nanopowder samples (as prepared above) were made in to pellets having uniform thickness of 3 mm using a hydraulic press. Absorbance spectra were taken using Perkin Elmer Lambda 900 UV/VIS Spectrometer. The respective spectra are set out in FIG. 20 where the leftmost trace is an undoped control. Each successive trace (moving from left to right) represents respectively the spectrum of each subsequent doped sample respectively 1:0.05 and 1:0.10. The fluorine doped samples shows strong absorption in the visible region. Band gap of samples were calculated by plotting absorbance against corresponding electron volts as set out in FIG. 21 (where the traces are in the same order as for FIG. 20 above). The maximum absorbance wavelength and the band gap values are set out Table 4.

TABLE 4

UV-visible spectroscopic properties of fluorine doped titanium dioxide

| Photocatalyst | Wavelength $\lambda_{max}$ (nm) | Band gap (eV) |
|---|---|---|
| Undoped $TiO_2$ | 428 | 2.90 |
| 1 $TiO_2$:0.05 TFA doped | 440 | 2.81 |
| 1 $TiO_2$:0.10 TFA doped | 449 | 2.76 |

Example 6

Microwave Assisted Synthesis of Sulphur Nitrogen Co-doped Titania

Nitrogen sulphur co-doped nanocrystalline titania powder was prepared by a microwave assisted method in an open vessel (100 ml glass beaker) using a very low power (300 W) microwave energy for 60 min. Molar ratios between titanium isopropoxide and thiourea used were 1:0, 1:0.05, 1:0.1, and 1:0.15.

Figure 22:
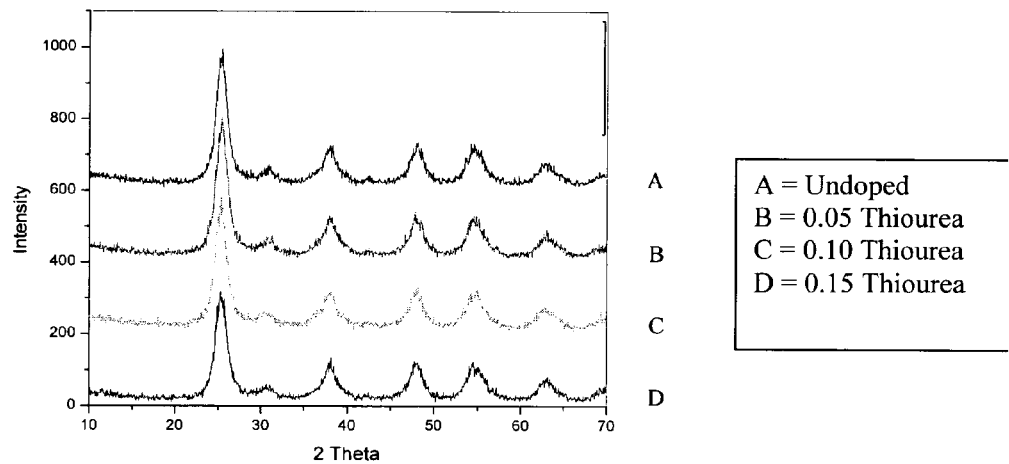
FIG. 22 is an X-ray diffraction pattern of undoped titanium dioxide photocatalyst and sulphur-nitrogen co-doped titanium dioxide photocatalyst synthesised using a microwave method.

Experimental 7.5 ml of titanium (IV) isopropoxide was added to 75 ml boiling water containing different amounts (see ratios above) of thiourea (as nitrogen and sulphur source) with constant stirring. Precipitated hydrated titanium oxide was stirred for 30 minutes, and treated with microwave radiations of power 300 W for 60 minutes in an open beaker. These materials were then washed, dried in an oven at 80° C. and the resulting material was powdered well. This results in the formation of nitrogen sulphur co-doped nanocrystalline titania powders. The spectra are set out in FIG. 22. The top trace in FIG. 22 represents an undoped control. Each successive trace (moving from top to bottom) represents respectively the spectrum for each subsequent doped sample respectively 1:0.05, 1:0.1, and 1:0.15.

UV-Visible Spectroscopic Studies

Figure 23:
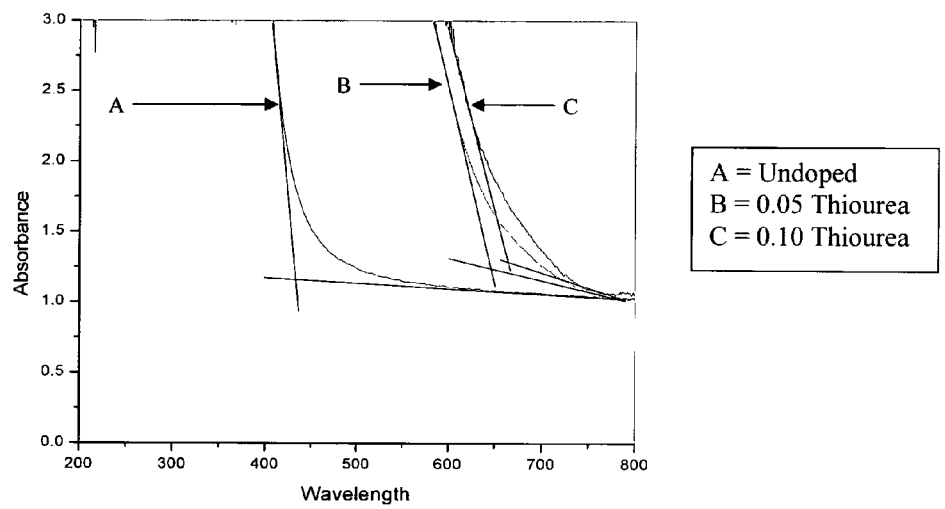
FIG. 23 is a UV-VIS absorption spectrum of the undoped titanium dioxide photocatalyst and sulphur-nitrogen co-doped titanium dioxide photocatalyst of FIG. 22.
Figure 24:
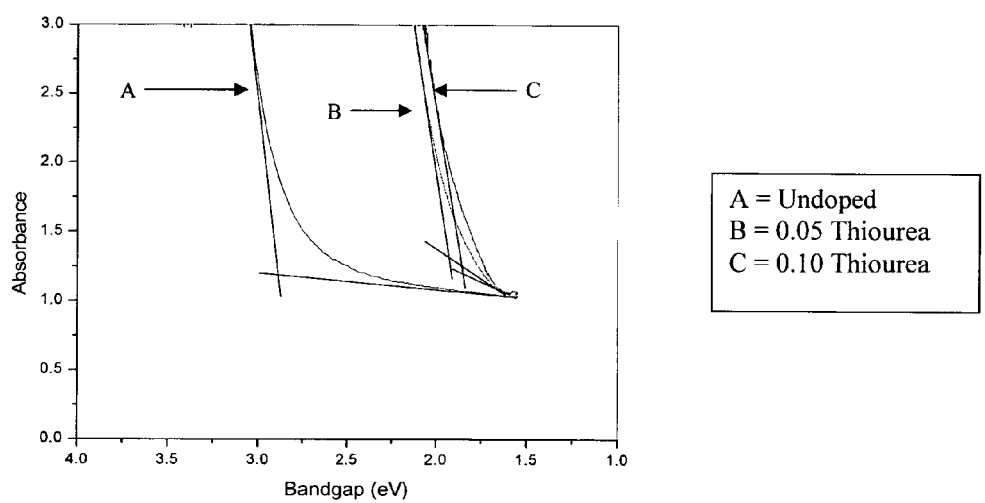
FIG. 24 is a plot showing the band gap (eV) determination of the undoped titanium dioxide photocatalyst and sulphur-nitrogen co-doped titanium dioxide photocatalyst of FIG. 22.

Titania nanopowder samples (as prepared above) were made into pellets having uniform thickness of 3 mm using a hydraulic press. Absorbance spectra were taken using Perkin Elmer Lambda 900 UV/VIS Spectrometer. The spectra are set out in FIG. 23. The leftmost trace in FIG. 23 represents an undoped control. Each successive trace (moving from left to right) represents respectively the spectrum for each subsequent doped sample respectively 1:0.05, 1:0.1, and 1:0.15. Co-doped samples containing sulphur and nitrogen shows strong absorption in the visible region. Band gap of samples were calculated by plotting absorbance against corresponding electron volts as set out in FIG. 24 (where the traces are in, the same order as for FIG. 23 above). The maximum absorbance wavelength and the band gap values are set out in Table 5.

TABLE 5

UV-visible spectroscopic properties of sulphur-nitrogen co-doped titanium dioxide

| Photocatalyst | Wavelength $\lambda_{max}$ (nm) | Band gap (eV) |
|---|---|---|
| Undoped $TiO_2$ | 428 | 2.90 |
| 1 $TiO_2$:0.05 Thiourea doped | 645 | 1.92 |

TABLE 5-continued

UV-visible spectroscopic properties of sulphur-nitrogen co-doped titanium dioxide

| Photocatalyst | Wavelength $\lambda_{max}$ (nm) | Band gap (eV) |
|---|---|---|
| 1 TiO$_2$:0.10 Thiourea doped | 664 | 1.86 |
| 1 TiO$_2$:0.15 Thiourea doped | 664 | 1.86 |

Further experiments have shown that silver nitrate, silver acetate, copper nitrate, copper sulphate, and boric acid can be used as dopant materials in the process described herein.

Example 7

Visible Light Photocatalytic Study of Microwave Titania Samples

Using the information in standard JIS R 1703-2 the visible light photocatalytic properties of undoped titanium dioxide photocatalyst prepared in accordance with the methodology of Example 1 above and nitrogen doped titanium dioxide photocatalyst prepared in accordance with the methodology of Example 4 above were tested.

To determine the rate of decomposition, a sample of the photocatalyst (0.06 g) was mixed with, methylene blue solution (50 ml of 1×10$^{-5}$M). A homogenous suspension was formed by stirring at room temperature (20° C.) in the dark for 15 mins. The suspension was irradiated with visible light (450 nm) at room temperature with stirring for 3 hours. Time dependent degradation of methylene blue was assessed by removing 5 ml aliquots from the suspension at 0 min, 60 min, 120 min, and 180 min. Once removed, aliquots were centrifuged and the absorbance spectra of the supernatant was recorded at room temperature using a UV/Vis spectrometer. The rate of 20 degradation was calculated using equation 1 below.

Figure 26:
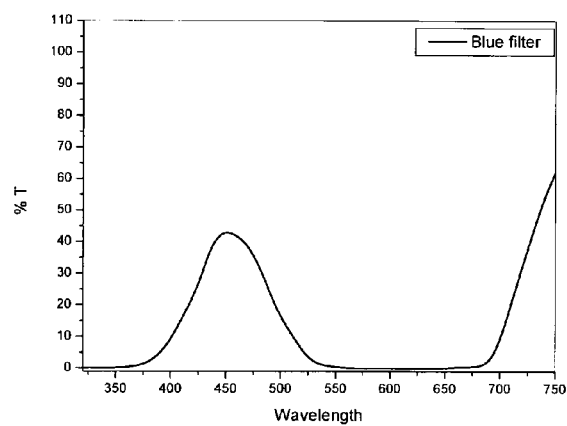
FIG. 26 is a transmission spectra for visible light using a 450 nm cut off filter.
Figure 27:
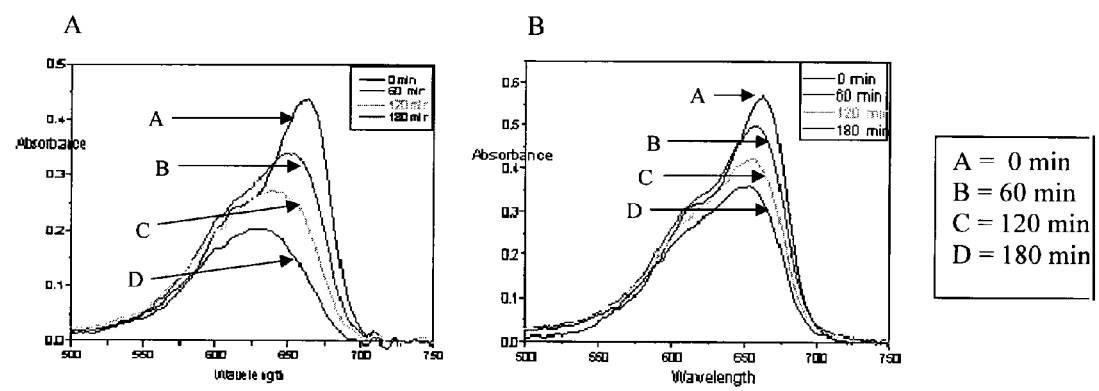
FIG. 27 is a UV-vis absorbance spectra for undoped titanium dioxide photocatalyst (A) and Degussa P-25 photocatalyst (B) over time.
Figure 29:
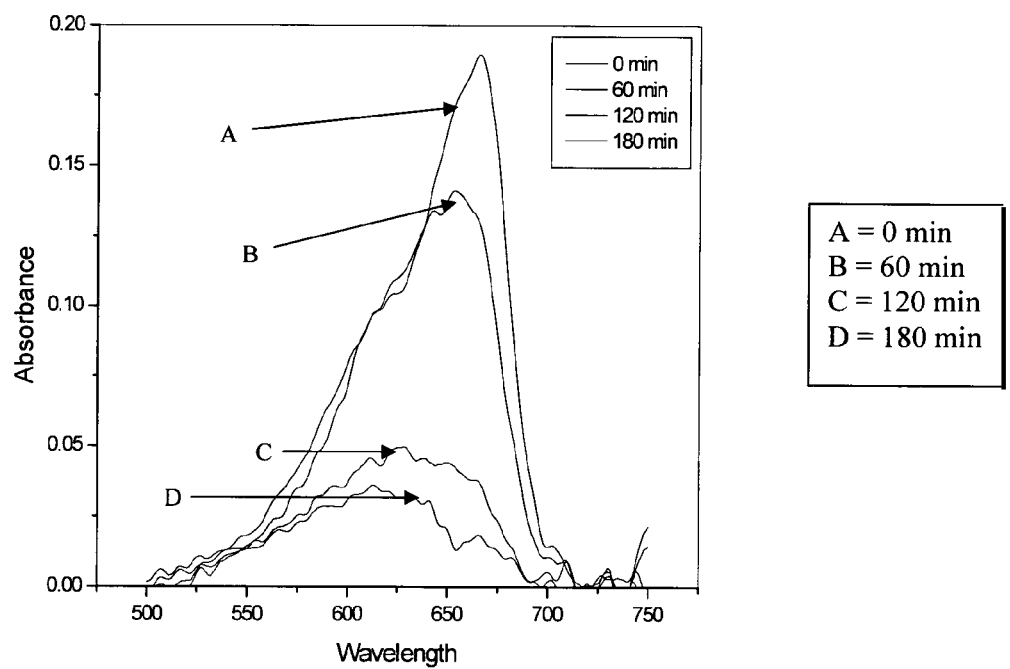
FIG. 29 is a UV-vis absorbance spectra for undoped and nitrogen doped titanium dioxide photocatalyst over time.

In more detail, in a typical experiment 0.06 gram of photocatalyst was mixed with 50 ml of 1×10$^{-5}$M methylene blue solution. The suspension obtained was then stirred in the dark for 15 minutes to ensure homogeneous mixing and to avoid any decrease in concentration of dye during the reaction as a result of adsorption. The suspension was then irradiated with visible light (450 nm) with stirring. Visible light was produced using a 450 nm cut off filter (FIG. 26) and a Q-Sun solar simulator. Degradation of dye was monitored by withdrawing 5 ml aliquots at regular intervals. The aliquots were centrifuged and absorption spectra of the samples were recorded using a UV/Vis spectrometer (FIG. 27 and FIG. 29). Rate of degradation was assumed to obey pseudo-first order kinetics (Equation 1). The rate constant for degradation. K, was calculated from the first order plot $$\ln\left(\frac{A_0}{A}\right) = kt \quad \text{Equation 1}$$

Where $A_0$ is the initial absorbance, A is absorbance after a time (t) and k is the first order rate constant.

Figure 28:
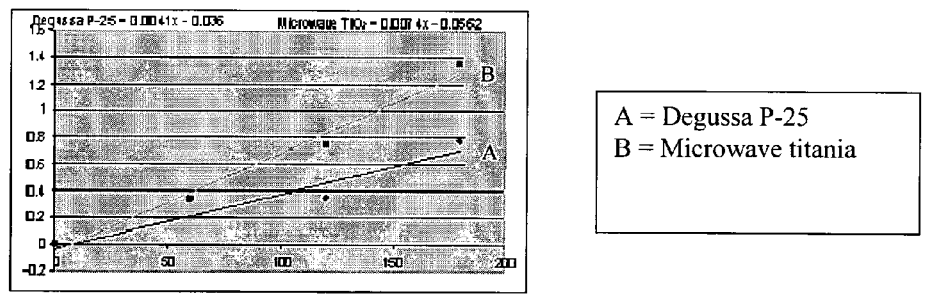
FIG. 28 is a graph showing the rate of decomposition of undoped titanium dioxide photocatalyst and Degussa P-25 photocatalyst irradiated with visible light (450 nm)
Figure 30:
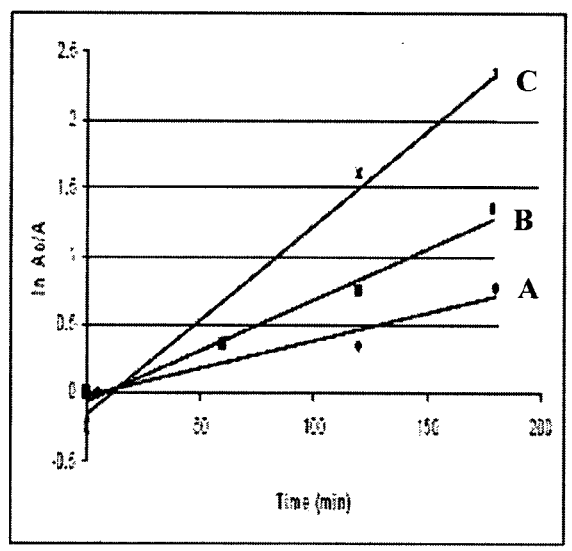
FIG. 30 is a graph showing the rate of decomposition of Degussa P-25 photocatalyst (line A), undoped titanium dioxide photocatalyst (line B), and 1:0.2 nitrogen doped titanium dioxide photocatalyst (line C) irradiated with visible light (450 nm)
Figure 31:
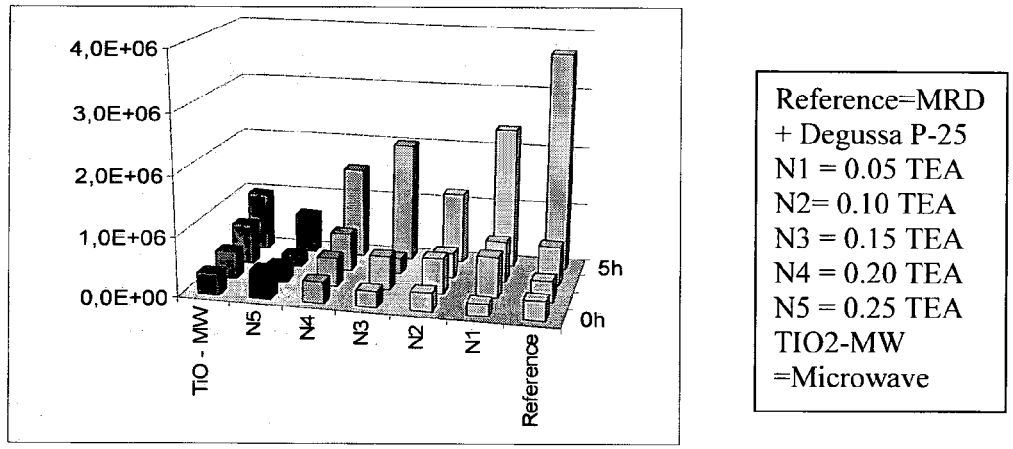
FIG. 31 is a bar chart showing the antibacterial activity against MRSA of undoped titanium dioxide photocatalyst, nitrogen doped titanium dioxide photocatalyst and Degussa P-25 photocatalyst over 5 hours under visible light irradiation from a light bulb.
Figure 32:
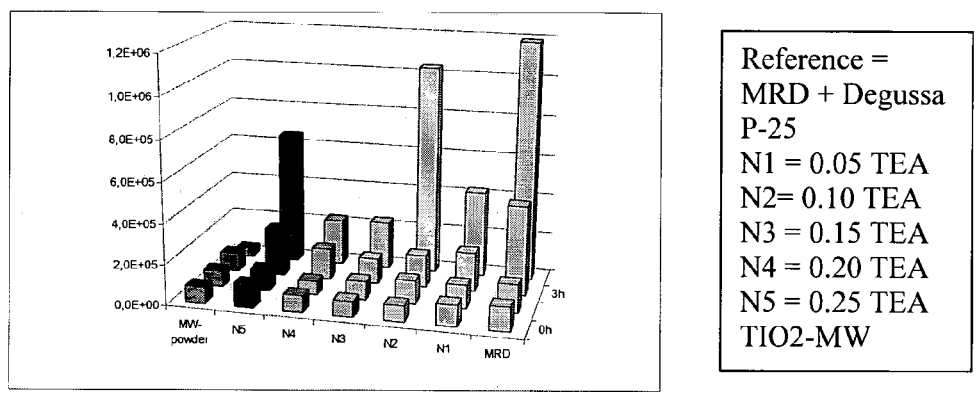
FIG. 32 is a bar chart showing the antibacterial activity against MRSA of undoped titanium dioxide photocatalyst, nitrogen doped titanium dioxide photocatalyst and Degussa P-25 photocatalyst over 5 hours under visible light irradiation from Q sun (450 nm)
Figure 33:
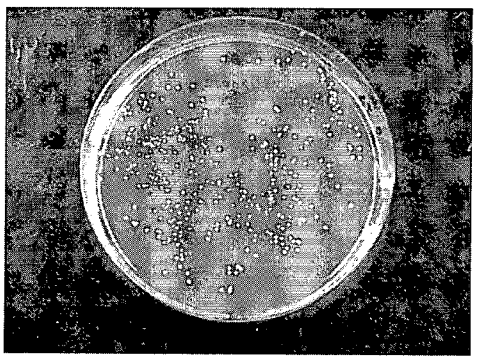
FIG. 33 A to D are photographs of MRSA colonies formed on agar plates in the presence of Degussa P-25 photocatalyst (B), undoped titanium dioxide photocatalyst (C) and 1:0.25 nitrogen doped titanium dioxide photocatalyst (D) over 5 hours under visible light; irradiation from a light bulb. Plate (A) is the control.
Figure 33:
Figure 33:
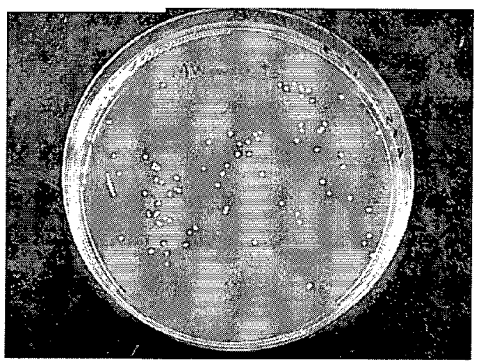
Figure 33:
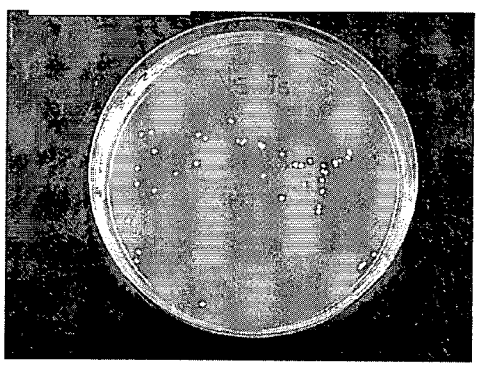
Figure 34:
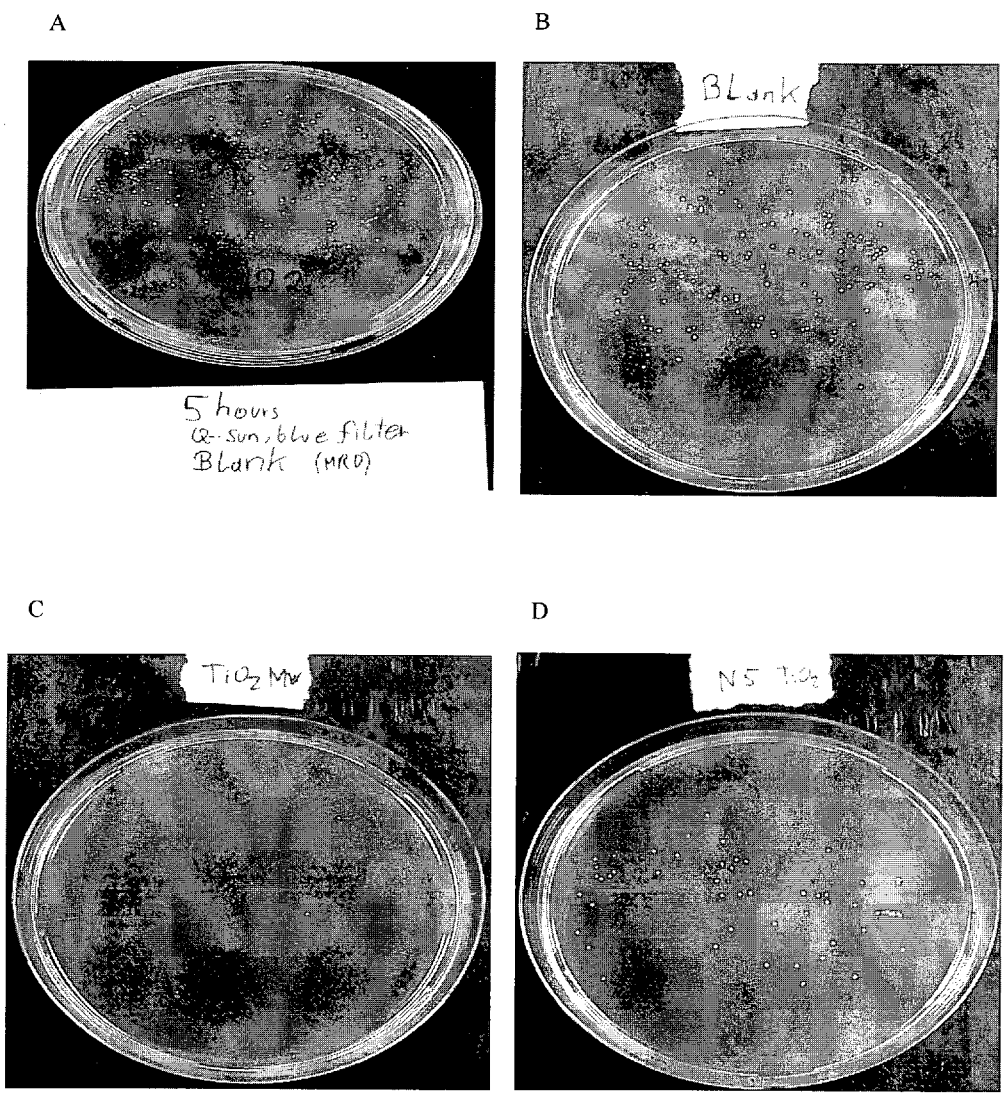
FIG. 34 A to D are photographs of MRSA colonies formed on agar plates in the presence of Degussa P-25 photocatalyst (B), undoped titanium dioxide photocatalyst (C) and 1:0.25 nitrogen doped titanium dioxide photocatalyst (D) over 5 hours under visible light irradiation from Q sun (450 nm). Plate (A) is the control.

The rate of decomposition is shown in FIG. 28 and FIG. 30 and Table 6 below.

TABLE 6

Rate of decomposition of photocatalysts irradiated with visible light

| Photocatalyst | Rate constant (min$^{-1}$) 450 nm |
|---|---|
| Degussa P-25 | 0.0041 |
| Undoped TiO$_2$ | 0.0074 |
| 1 TiO$_2$:0.10 nitrogen doped | 0.0094 |
| 1 TiO$_2$:0.15 nitrogen doped | 0.0124 |
| 1 TiO$_2$:0.20 nitrogen doped | 0.0138 |

The undoped titanium dioxide microwave sample exhibited a faster rate of decomposition (almost double the activity) compared to Degussa P-25. We calculated the rate constants, for Degussa P-25 and undoped titanium dioxide microwave sample as 0.0041 and 0.0074 min$^{-1}$ respectively. The high visible light activity of undoped titanium dioxide microwave sample can be correlated to the low band gap (about 2.9 eV) and high surface area (between 100 m$^2$/g and 400 m$^2$/g). Absorption peaks (FIG. 27) for both samples shows a blue shift with a decrease in the intensity. The blue shift was greater for the undoped titanium dioxide microwave sample. These results show the undoped titanium dioxide has a higher rate of photocatalytic ability than Degussa P-25 under visible light irradiation. Nitrogen doped microwave titania samples exhibit higher photocatalytic activity then undoped titanium dioxide and Degussa P-25 (FIG. 30). A gradual increase in activity was observed with increase in the amount of triethyl amine (Dopant). 1:0.2 triethyl ammine modified sample was 3.4 times active compared to Degussa P-25 the standard photocatalyst.

Example 8

Antimicrobial Study of Microwave Titania Samples

The photocatalysts described herein exhibit antimicrobial properties. The photocatalysts can be considered to be active against microbes such as bacteria, viruses, fungi and yeast. The photocatalysts may be effective against a broad range of bacteria including gram positive and gram negative bacteria, sporicidal bacteria and non-spore forming bacteria. The photocatalysts may be effective against antibiotic resistant bacteria such as methicillin resistant staphylococcus aureus (MRSA) and spore forming bacteria such as Clostridium difficile.

It is anticipated that the photocatalysts described herein may be incorporated into a coating. The coating may be considered as a self cleaning or antimicrobial coating as the photocatalyst present in the coating will exhibit an antimicrobial effect when irradiated with visible light. For example, when activated by visible light, the photocatalyst will break down microbes that have been deposited on a coated surface, killing the microbes and/or preventing colonization of the surface by microbes.

In a typical experiment, 0.01 g of undoped or nitrogen doped titanium dioxide was dispersed in 0.5 ml sterile MRD (containing a magnetic bar). The solution was then stirred for 15 min to disperse the sample. The resulting suspension was then inoculated with 500 µl of a 1:10$^2$ diluted overnight.

Staphylococcus aureus (ATTC 25923) bacterial culture. After inoculation, 45 μl of the test suspension (photocatalyst+bacteria) was withdrawn and mixed with 4.5 ml sterile MRD (=$10^2$ dilution). Then 500 μl of the $10^2$ diluted sample was withdrawn and mixed again with 4.5 ml sterile MRD (=$10^3$ dilution). 100 μl of each diluted suspension was put on a Müller Hinton Agar plate and spread on the plate using a plastic spreader. After the first withdraw of sample ($t_o$) the light source (light bulb or Q-sun) was turned on. 100 μl of samples were withdrawn, diluted and spread at regular time intervals (1 h, 3 h, 5 h). Müller Hinton agar-plates were kept over night in an incubator at 37° C. Bacterial colonies (CFU) were counted the next morning. Pure and doped microwave samples were found to be antibacterial both under bulb light and simulated 450 nm visible light (FIGS. 31 to 34).

TABLE 7

Number of bacterial colonies per plate after visible light catalytic study.

| Photocatalyst | Number of colonies per plate (after 5 hrs) using bulb as light source (CFU/ml) | Number of colonies per plate (after 5 hrs) using Q sun as light source (450 nm) (CFU/ml) |
|---|---|---|
| Degussa P-25 | $4.2 \times 10^2$ | $1.2 \times 10^2$ |
| Undoped TiO$_2$ | $0.98 \times 10^2$ | $0.03 \times 10^2$ |
| 1 TiO$_2$:0.25 nitrogen doped | $0.38 \times 10^2$ | $0.56 \times 10^2$ |

TABLE 8

Surface area values of microwave samples

| Composition | Surface area (m$^2$/g) | Pore diameter (nm) | Pore volume (cc/g) |
|---|---|---|---|
| 20 min microwave | 242.30 | 4.32 | 0.269 |
| 40 min microwave | 233.70 | 4.63 | 0.281 |
| 60 min microwave | 231.40 | 4.61 | 0.268 |
| Degussa P-25 | 46.70 | 3.89 | 0.129 |

Example 9

Raman Spectral Analysis

Figure 35:
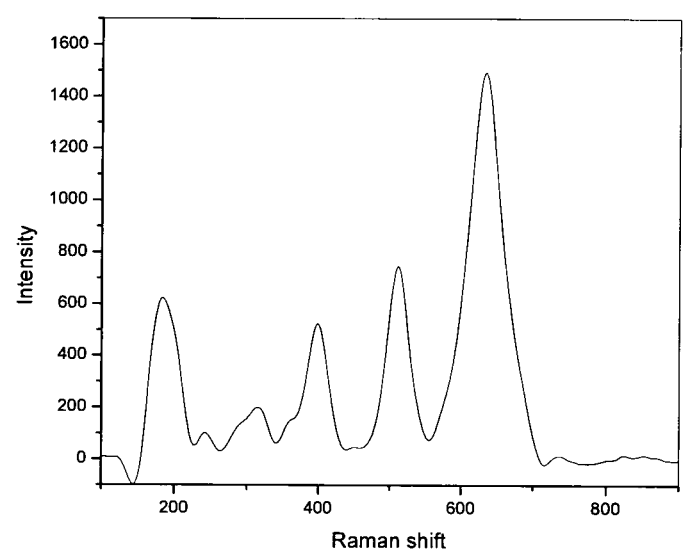
FIG. 35 is a graph showing the laser Raman spectra for undoped titanium dioxide photocatalyst.

Being a more surface sensitive method, laser raman spectroscopy was employed for analysing the phase homogeneity of the samples. Bands observed at 147, 197, 396, 515 and 638 cm-1 can be assigned to the presence of major phase anatase. A low intensity peak corresponding to brookite was observed at 247 cm-1. Peak broadening in raman spectra indicate nanocrystalline nature of the microwave titania samples (FIG. 35).

Example 10

Surface Area Measurements of Undoped Titanium Dioxide Photocatalyst

BET isotherms of the microwave samples were found to be type IV with high surface area. All these samples belong to mesoporous family (pore diameter 2-50 nm). A gradual decrease in surface area with increase in microwave irradiation time was observed. The decrease in surface area between 20 and 40 minutes of irradiation was about 10 m$^2$/g. A negligible decrease in surface area was observed following 40 min microwave treatment. These observations are consistent with a drastic increase in crystallite size after 20 minutes microwave irradiation and a gradual but slow increase in crystallite size after that. No significant change in pore diameter and volume were observed following microwave treatment. The surface area of titanium dioxide photocatalyst synthesised using the microwave process described herein were about five times greater than of Degussa P-25. The pore volume and pore diameter of titanium dioxide photocatalyst synthesised using the microwave process described herein was also greater than that of Degussa P-25.

Example 11

A Film or Coating Incorporating a Photocatalyst

Powdered photocatalyst can be incorporated into a sol for example a sol based on 3(trimethoxysilyl) propyl methacrylate. (MAPTMS), ethanol and methacrylic acid (MAAH). Powdered photocatalysts can be incorporating into both aqueous and organic based paints.

A variety of surfaces can be coated with a sol or paint incorporating a photocatalyst. For example a photocatalyst containing sol or paint can be used to coat surfaces such as glass, metal (copper, chrome and steel), fabrics, ceramics and wood. Standard coating techniques such as spray coating or dip coating can be used to coat surfaces either at the manufacturing stage or when the surface is assembled ready for use.

By incorporating a photocatalyst into a sol and/or paint while retaining the photocatalytic properties, the photocatalyst can be applied to most surface materials including fabrics to provide a coating having self-cleaning properties and/or antimicrobial properties.

The invention extends to a process substantially as described herein with reference to the accompanying examples.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention is not limited to the embodiment hereinbefore described, with reference to the accompanying drawings, which may be varied in construction and detail.

The invention claimed is:

1. A visible light activatable mesoporous anatase phase titanium dioxide photocatalyst having a surface area of from 200 m$^2$/g to 300 m$^2$/g, and a band gap width of less than 2.95 eV and a rate of decomposition greater than 0.007 min$^{-1}$ at a wavelength of 450 nm.

2. The photocatalyst as claimed in claim 1 wherein the photocatalyst has a band gap width of 2.9 eV or less.

3. The photocatalyst as claimed in claim 1 comprising undoped titanium dioxide.

4. The photocatalyst as claimed in claim 1 comprising doped titanium dioxide.

5. The photocatalyst as claimed in claim 4 wherein the dopant is selected from any one or more of the group comprising: fluorine, iron, nitrogen, phosphorus, and sulphur.

6. The photocatalyst as claimed in claim 5 wherein the dopant is nitrogen.

7. The photocatalyst as claimed in claim 4 wherein the dopant comprises between about 1:0.0001 and about 1:0.5 molar ratio titanium dioxide: dopant.

8. The photocatalyst as claimed in claim 4 wherein the dopant comprises between about 1:0.05 to about 1:0.25 molar ration titanium dioxide: dopant.

9. The photocatalyst as claimed in claim 1 wherein the photocatalyst has a crystalline structure.

10. The photocatalyst as claimed in claim 9 wherein the photocatalyst has a crystallite size range of between about 5 nm to about 50 nm.

11. The photocatalyst as claimed in claim 9 wherein the photocatalyst has a crystalline size range of between about 10 nm to about 30 nm.

12. An antimicrobial composition comprising a photocatalyst as claimed in claim 1.

13. A film or coating comprising a photocatalyst as claimed in claim 1.

14. An antimicrobial film or coating comprising the photocatalyst as claimed in claim 1.

15. The photocatalyst as claimed in claim 1 wherein the photocatalyst has a band gap width of 2.82 eV or less.

16. A photocatalyst comprising undoped mesoporous titanium dioxide with a band gap width of 2.9 eV and a surface area of between 100 m$^2$/g and 400 m$^2$/g.

17. A process for forming a nanoporous crystalline material from an inorganic or organic precursor thereof comprising the steps of:
   i) preparing a suspension from the inorganic or organic precursor; and
   ii) utilising microwave irradiation, under non-pressurised conditions suitable to crystallise the material from the suspension, to crystallise the material from the suspension;
wherein the process takes place at a temperature of about 100° C.

18. A process for the formation of a nanoporous crystalline material with a low energy band gap comprising the step of utilising microwave irradiation under non-pressurised conditions to crystallise a suspension of an inorganic or organic precursor of a nanoporous crystalline material under suitable conditions to form a nanoporous crystalline material with a low energy band gap, wherein the process takes place at a temperature of about 100° C.

* * * * *

UNITED STATES PATENT AND TRADEMARK OFFICE
CERTIFICATE OF CORRECTION

| | | |
|---|---|---|
| PATENT NO. | : 8,551,909 B2 | Page 1 of 1 |
| APPLICATION NO. | : 12/736118 | |
| DATED | : October 8, 2013 | |
| INVENTOR(S) | : Etacheri et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 80 days.

Signed and Sealed this
Seventh Day of July, 2015

Michelle K. Lee
*Director of the United States Patent and Trademark Office*